US011100599B2

(12) United States Patent
Rowan et al.

(10) Patent No.: US 11,100,599 B2
(45) Date of Patent: Aug. 24, 2021

(54) CAREER SKILLS VISUALIZATION, TRACKING AND GUIDANCE

(71) Applicant: Pearson Education, Inc., New York, NY (US)

(72) Inventors: Barbara Ellen Rowan, Macon, GA (US); Amy Catherine Wood, Superior, CO (US)

(73) Assignee: PEARSON EDUCATION, INC., New York, NY (US)

( * ) Notice: Subject to any disclaimer, the term of this patent is extended or adjusted under 35 U.S.C. 154(b) by 601 days.

(21) Appl. No.: 15/937,391

(22) Filed: Mar. 27, 2018

(65) Prior Publication Data

US 2019/0096016 A1    Mar. 28, 2019

Related U.S. Application Data

(63) Continuation-in-part of application No. 15/714,645, filed on Sep. 25, 2017, now Pat. No. 10,755,593.

(51) Int. Cl.
*G09B 5/02*    (2006.01)
*G06Q 50/20*    (2012.01)
*G06F 16/25*    (2019.01)

(52) U.S. Cl.
CPC ....... *G06Q 50/2057* (2013.01); *G06F 16/258* (2019.01)

(58) Field of Classification Search
CPC ............. G09B 5/02; G06Q 10/063112; G06Q 50/2057
See application file for complete search history.

(56) References Cited

U.S. PATENT DOCUMENTS

| | | | | |
|---|---|---|---|---|
| 7,555,441 | B2 * | 6/2009 | Crow | G06Q 10/0631 705/7.14 |
| 9,558,271 | B1 * | 1/2017 | Sathe | G06F 16/367 |
| 2003/0187723 | A1 * | 10/2003 | Hadden | G09B 7/00 705/7.42 |
| 2007/0271108 | A1 * | 11/2007 | Broderick | G06Q 10/06398 705/7.42 |
| 2008/0065464 | A1 | 3/2008 | Klein et al. | |

(Continued)

*Primary Examiner* — Peter R Egloff
(74) *Attorney, Agent, or Firm* — Quarles & Brady LLP

(57) ABSTRACT

An online career guidance system generates and displays superimposed polygons to a user for a corresponding career. The first polygon may have three to eight vertices, with each vertex representing a career skill. The distance from a focus to each vertex represents a career skill level predetermined to be needed for that career skill for that career. The second polygon has the same number of vertices as the first polygon that represent the same career skills and shares the same focus. The distance from the focus to each vertex of the second polygon represents a user skill level determined from previous achievements of the user. The distance between a career skill level and a user skill level (preferably both normalized to the same scale) visually represents any career skill deficits (or over qualifications) the user may have for the selected career. The online career guidance system may determine, recommend and register the user into one or more classes, clubs and/or projects that are likely to reduce or eliminate any career skill deficits of the user.

19 Claims, 20 Drawing Sheets

(56) References Cited

U.S. PATENT DOCUMENTS

| | | | |
|---|---|---|---|
| 2009/0132313 A1* | 5/2009 | Chandler | G06Q 10/06 705/7.14 |
| 2013/0197967 A1 | 8/2013 | Pinto et al. | |
| 2016/0063523 A1 | 3/2016 | Nistor et al. | |
| 2017/0206616 A1 | 7/2017 | Chagpar et al. | |
| 2018/0012186 A1* | 1/2018 | Baker, IV | G06Q 10/1053 |

* cited by examiner

INTERFACE FOR LEARNER TO ENTER A FEEDBACK REQUEST

FIG. 8

INTERFACE FOR LEARNER TO RECEIVE FEEDBACK

US 11,100,599 B2

CAREER SKILLS VISUALIZATION, TRACKING AND GUIDANCE

CROSS-REFERENCE TO RELATED PATENT APPLICATIONS

This application is a continuation-in-part of U.S. patent application Ser. No. 15/714,645 titled "Real-World Feedback Network for Feedback Recipients" filed on Sep. 25, 2017 which is incorporated herein by reference in its entirety.

FIELD OF THE INVENTION

This disclosure relates to an online career guidance system graphically generating and displaying user skill levels superimposed with career skill levels for one or more selected careers so that the user may visually see careers they are qualified for and/or any deficiencies and the online career guidance system assisting the user in mitigating the deficiencies.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to allow an instructor and/or a learner to shape and request feedback for a project from a plurality of contributors.

The invention is a method for an online educational institute to provide feedback for a project from a plurality of contributors that are part of a feedback network to a learner and an instructor. The online educational institute may comprise computer code running on one or more hardware servers and may access to one or more hardware databases. The computer code may be, at least, a request modifier and a feedback aggregator.

The request modifier may electronically transmit a first interface to a client device of an instructor configured to allow the client device of the instructor to enter a default request for feedback for the project from client devices of the plurality of contributors to the learner. The default request may include, as non-limiting examples, a feedback due date or a project due date, a project title or a project description, a suggested feedback type, a desired volume of feedback and a plurality of groups, each group comprising a plurality of potential contributors.

The request modifier may assign a character string to the default request entered by the instructor. The instructor may communicate, preferably via the client devices of the instructor and the learners, the character string assigned to the default request for feedback from the contributors.

The request modifier may electronically receive the character string from the client device of the learner. The request modifier may electronically transmit a second interface to the client device of the learner. In some embodiments, the learner is not given an option to change the default request for feedback as entered by the instructor. The default request is submitted to the contributors.

In other embodiments, the interface may be configured to allow the client device of the learner to enter an initial request (possible alterations or modifications from the default request) for the feedback for the project from client devices of the plurality of contributors to the learner. As non-limiting examples, the initial request may comprise the feedback due date or the project due date, the project title or the project description, the suggested feedback type and/or the desired volume of feedback and the plurality of groups with each group comprising a plurality of potential contributors.

The request modifier may electronically receive a plurality of past requests and a corresponding plurality of past feedback from a hardware database. The request modifier may use the past requests and corresponding past feedback to determine a plurality of most similar past requests to the initial request in the plurality of past requests. The request modifier may use the past volume of feedback from the most similar past requests to determine an average volume of feedback for the similar past requests.

The request modifier may assign a predicted volume of feedback for the default request or initial request based on an average volume of past feedback for the plurality of most similar past requests.

The request modifier may modify the default request or the initial request to generate a modified request that is preferably predicted to receive a volume of feedback closer to the desired volume of feedback than the predicted volume of feedback for the default request or the initial request. The request modifier may make adjustments, such as changing the type of desired feedback or the number of contributors receiving the request for feedback, to create a modified request that will receive a desired volume of feedback as selected by the instructor or learner.

The request modifier may electronically transmit the modified request to the plurality of contributors for feedback. One or more of the contributors receiving the submitted request for feedback may accept the request and/or provide feedback on the project using an interface presented to the contributors.

The feedback aggregator may electronically receive the plurality of feedback from the one or more responding contributors. The feedback aggregator may generate and electronically transmit an interface displaying the plurality of feedback for the project from the plurality of contributors to the client device of the learner and a client device of an instructor.

In another embodiment, a method may be used to provide career guidance to the user, i.e., the learner. An online career guidance system may read from a first database a plurality of user scores. Each user score may be determined from a different achievement of the user. The achievements of the user may be, as non-limiting examples, a previous score received, possibly as a grade in a class, a score on one rubric criterion from a final project in a course and/or one or more feedbacks or scores/ratings from one or more online contributors.

The online career guidance system may convert each user score into one or more user skill levels thereby generating a plurality of user skill levels. In a preferred embodiment, each user skill level represents a predicted level of a skill of the user for a particular skill predetermined to be desired in one or more careers. Thus, a score from one criterion in a rubric in a heavily weighted project in a chemistry class may be used, preferably with other data points from other classes, to predict a user skill level for the career skills of, as non-limiting examples, logical reasoning and a user skill level for the career skill of data analysis.

The online career guidance system may normalize the plurality of user skill levels to a desired scale to generate a plurality of normalized user skill levels. While any scale may be used, such as between 1-5 or 0-100, in a preferred embodiments the plurality of user skill levels are normalized to the scale of 1-10 to produce normalized user skill levels. Thus, a user score of an "A" in a class may be normalized to a "10," while a "B" may be normalized to an "8," and so on. As another example, a user score of a 98% in a class may be normalized to a "10," while a user score of 72% may be normalized to a "7." If a user has different normalized user skill levels for the same career skill, the different normalized user skill levels may be, as non-limiting examples, 1) averaged, 2) only the most recent user score used or 3) only the most recent user scores within a most recent time period, such as within the last year, are averaged to produce a single normalized user skill level for the career skill.

It should be appreciated that each user score, user skill level or normalized user skill level may be weighted differently from other user scores, user skill levels or normalized user skill levels. For example, a final course grade in a business writing course is preferably weighted more heavily than a score on a rubric criterion of "writing quality" from a marketing course project. Also, the system, over time, may learn which inputs are most valid and valuable predictors of success in that area.

The online career guidance system may read from a second database a plurality of careers and a plurality of career skill levels for each of the plurality of careers. Each career skill level for each of the plurality of careers represents a level of a skill predetermined to be desired in the career. Thus, if critical thinking is predetermined to be an important or essential career skill for the career of journalism, then critical thinking will be selected as one of the career skills for that career. In addition, if critical thinking is particularly important, even when compared against other important or essential career skills for that career, it may be assigned a high number on the scale, such as a 10 on a scale of 1-10. If the career skill is important to the career, and thus one of career skills for that career, but not as important as the other selected career skill for that career, a lower number, such as a 7 on a scale of 1-10 may be selected as the career skill level for that given career. In other words, each career may have its own combination, preferably three to eight, of important career skills and each career skill may be assigned its own career skill level for each career. In some embodiments, the online guidance system may normalize the plurality of career skill levels, if they are not already normalized, to the same scale as the normalized user skill levels, to generate a plurality of normalized career skill levels. Normalizing the user skill levels and career skill levels to the same scale allows the user skill levels and career skill levels to be graphically displayed to the user on a client for easy comparison.

As a non-limiting example of selecting one or more careers to graphically display to the user on the client, the careers may be presented in a list or a menu of selectable items. This embodiment provides the user the most control over which careers are selected and corresponding graphs are displayed to the user. The user may select and the online guidance system may receive from the user one or more selected careers that have the most interest to the user.

In another example of selecting one or more careers to graphically display to the user on the client device, the online career guidance system may compare a plurality of normalized career skill levels for each career in the plurality of careers with a corresponding plurality of normalized user skill levels in the plurality of normalized user skill levels. The online career guidance system may select one or more careers in the plurality of careers with a plurality of normalized career skill levels that most closely matches a corresponding plurality of normalized user skill levels. This selection method displays to the user careers that closely align with the user skill level for the important career skills of the career.

In another example of selecting one or more careers to graphically display to the user on the client device, the online career guidance system may display a plurality of criteria for selecting one or more careers in the plurality of careers. Thus, the user may select a criteria of "fully qualified," "stretch careers," "random selection," "closely matches" or "fewest number of career skill deficiencies." The online career guidance system may receive a criteria selected by the user from the plurality of displayed criteria. The online career guidance system may compare a plurality of normalized career skill levels for each career in the plurality of careers with a corresponding plurality of normalized user skill levels in the plurality of normalized user skill levels. The online career guidance system may select one or more careers from the plurality of careers based on 1) the criteria selected by the user, and 2) the comparing of the plurality of normalized career skill levels with the corresponding plurality of normalized user skill levels.

The online career guidance system may display on the client to the user a first polygon having a first plurality of vertices and a first focus. Each vertex of the first polygon may be spaced a distance from the first focus based on a normalized career skill level in the plurality of normalized career skill levels for the selected career. Thus, a higher normalized career skill level will result in a vertex further from the first focus while a lower normalized career skill level will result in a vertex closer to the first focus. This is a graph illustrating the important career skills and the career skill levels predetermined to be needed for each career skill to perform the selected career. In other words, this is a graph that shows the baseline or the goal of where the user should be striving towards.

The online career guidance system may also display on the client to the user a second polygon, superimposed with the first polygon, having a second plurality of vertices and a second focus. The first polygon and the second polygon preferably have the same number of vertices and the second focus is located at the same position on the client as the first focus. This superposition or overlaying of the graphs makes it easier to compare the normalized career skill levels with the normalized user skill levels. Each vertex of the second polygon is spaced a distance from the second focus based on a normalized user skill level in the plurality of normalized user skill levels for the selected career. Each vertex of the second polygon is preferably located on a hypothetical line defined by the first focus and a corresponding vertex of the first polygon. Each vertex of the first polygon or the second polygon may be labeled with a career skill that corresponds with the normalized career skill level and the normalized user skill level for that vertex.

In some embodiments, the online career guidance system may determine a career skill deficit between a normalized career skill level in the plurality of normalized career skill levels for the selected career and a corresponding normalized user career skill level in the plurality of normalized user career skill levels. The deficit represents a place where the user should attempt to improve the normalized user skill level to more close match or exceed the normalized career skill level so that the user is well qualified for the selected displayed career.

The online career guidance system may select an action that has previously been determined to reduce the career skill deficit. In a preferred embodiment, the online career guidance system attempts to recommend the fewest possible actions that correct the maximum number of career skill deficits of the user. As an example, the online career guidance system may recommend taking a series of classes to learn a new language if the user has career skill deficits in communication skills and creativity and it is known that learning another language improves/mitigates/reduces career skill deficits in these career skills.

The online career guidance system may display one or more actions on the client to the user near the first polygon and the second polygon to reduce the career skill deficit. The actions may be to take one or more classes, join one or more clubs, request additional feedback from contributors and/or complete one or more projects that are known to improve a user skill level for the career skill that has the career skill deficit. In some embodiments, the user skill deficits and the actions performed by the user may be tracked to determine which actions are the most effective at reducing particular career skill deficits. This information may be used to assist other users having the same career skill deficit by recommending the actions to those future users that are known to be the most effective at reducing the career skill deficit.

In some embodiments, the online career guidance system may receive a selection of the displayed action on the client by the user. In other words, the user has selected/indicated a desire to perform one of the displayed actions so that the user may improve one or more of the career skill deficits the user has for a selected career. The online career guidance system may perform a registration process of the user for the action, such as registering the user into a particular educational class, providing information about joining a relevant club or instructions for performing a related project.

In another embodiment, the online career guidance system may display a plurality of polygons with the same number of vertices sharing a common focus with each vertex representing a normalized user skill level. Each polygon may represent a different point in time or a time period for the normalized user skill levels. This allows a user to see their normalized user skill levels over time to see if they are making any progress in developing their career skills. These polygons may be superimposed, i.e., displayed with or over, a polygon representing normalized career skill levels that represent career skill levels for a selected career. This allows the user to see how their improvements, over time, if any, are moving them closer to the desired skill levels needed for the various career skills of the selected career.

The above features and advantages of the present invention will be better understood from the following detailed description taken in conjunction with the accompanying drawings.

BRIEF DESCRIPTION OF THE DRAWINGS

FIG. 8 illustrates a possible interface for a learner to enter a character string that will auto populate the default request entered by the instructor into the interface displayed on the client device of the learner.

DETAILED DESCRIPTION

Figure 1:
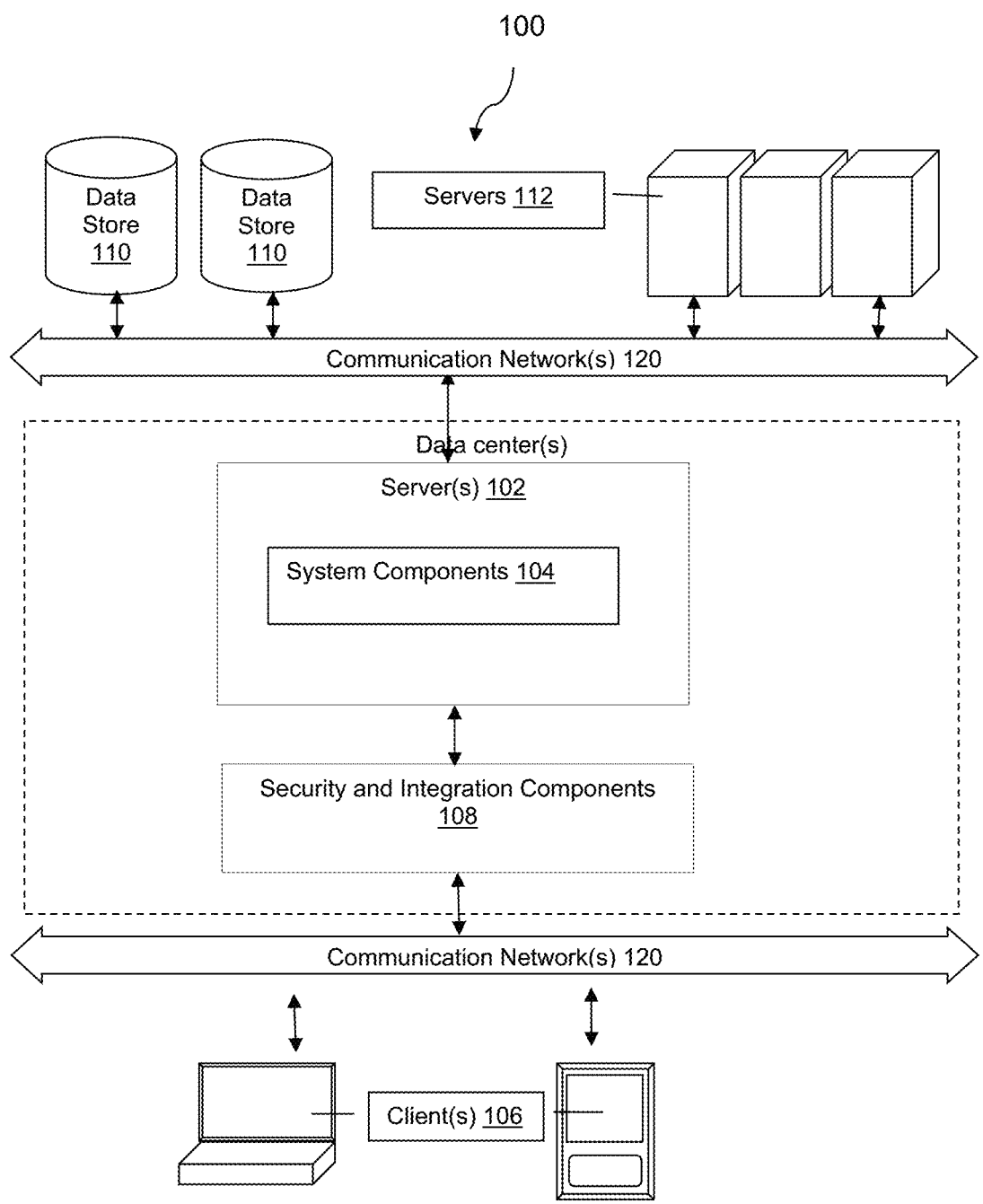
FIG. 1 illustrates a system level block diagram for a computer environment that allows an instructor or a user on a client device to shape and request feedback over a computer network from a plurality of contributors on client devices.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
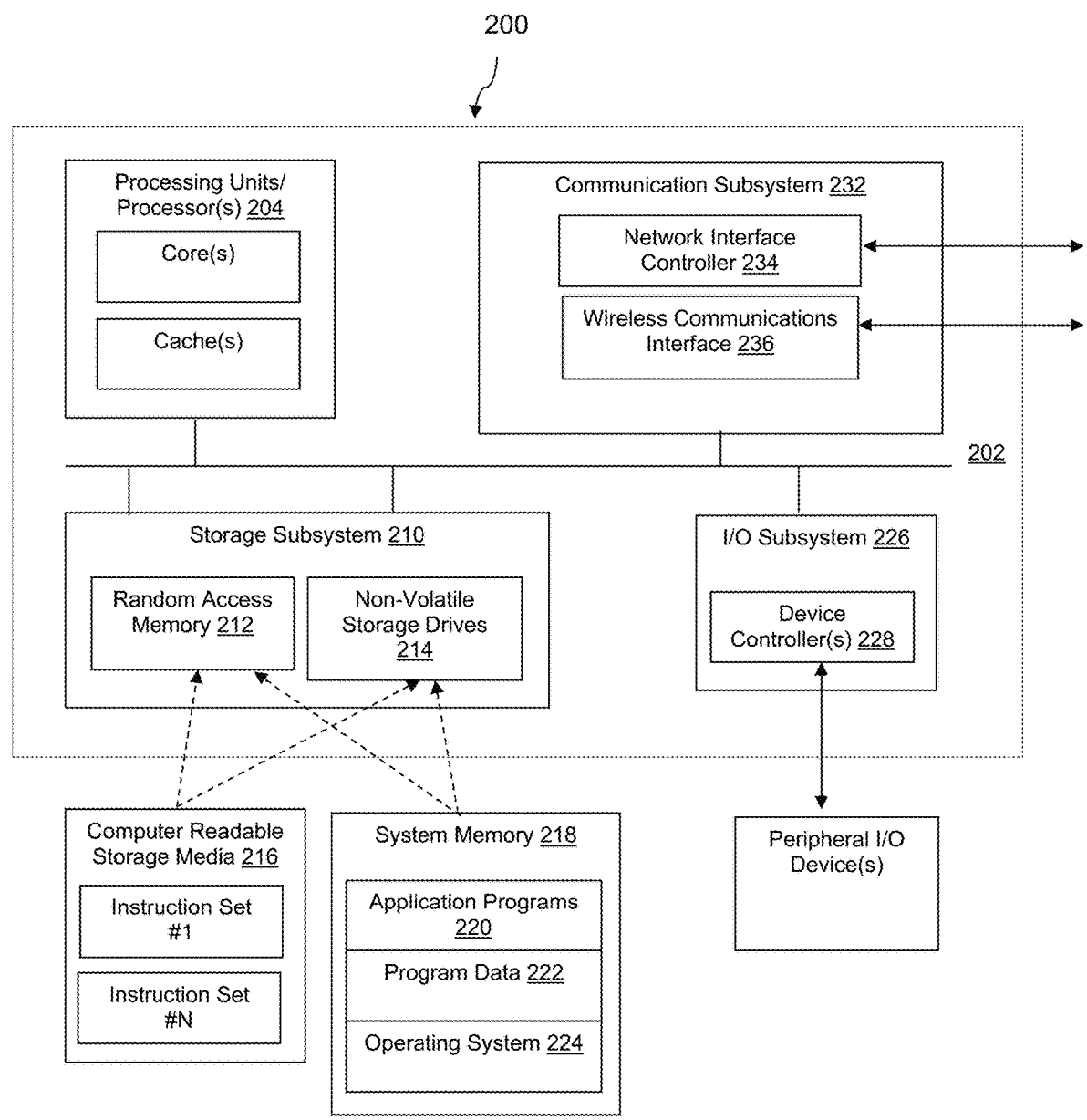
FIG. 2 illustrates a system level block diagram for a computer system that may be used in part to allow an instructor and/or a user on a client device to shape and request feedback over a computer network from a plurality of contributors on client devices.
Figure 3:
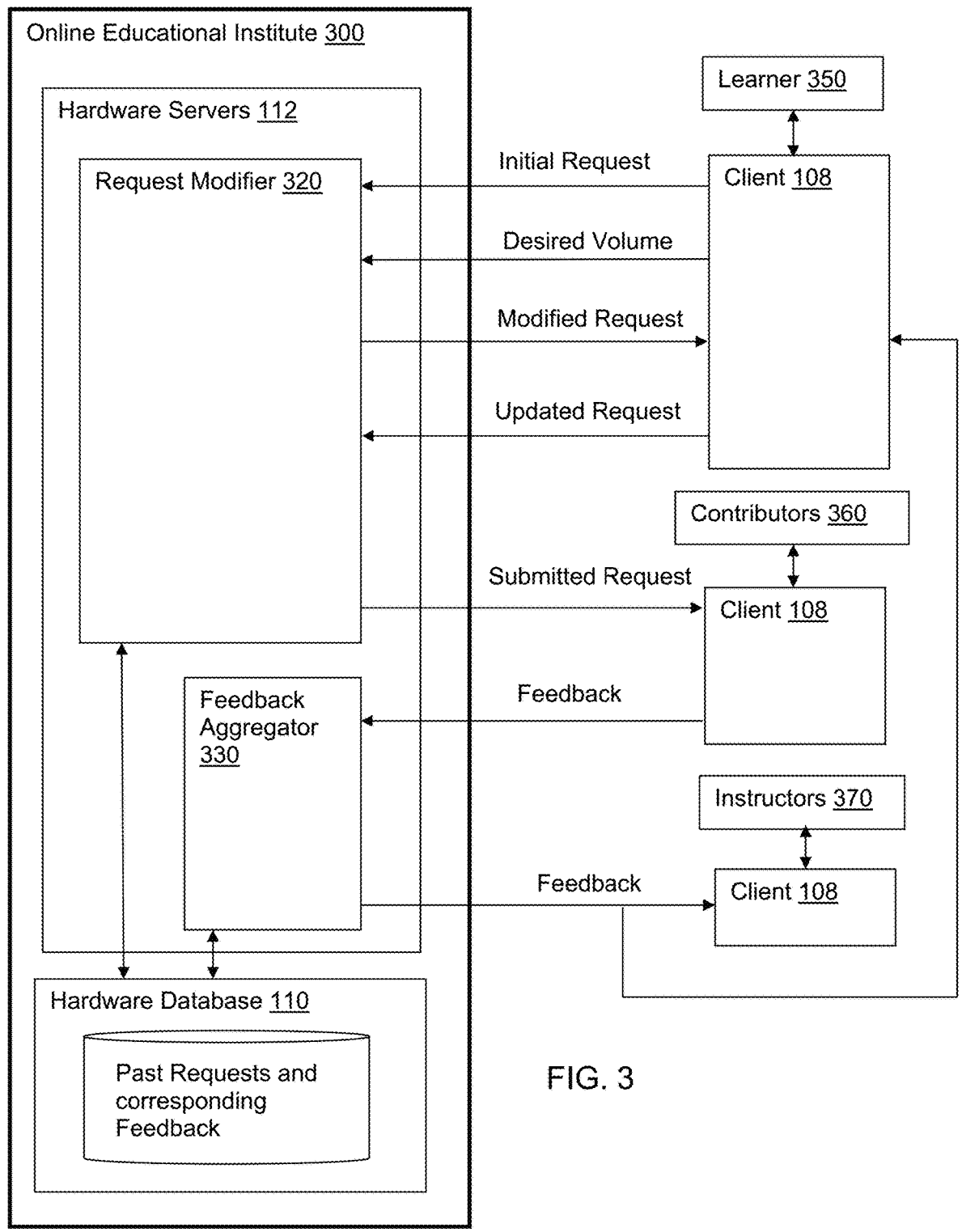
FIG. 3 illustrates a block diagram of a system that allows an instructor and/or a user on a client device to shape and request feedback over a computer network from a plurality of contributors on client devices. A request modifier may also modify a request for feedback from the instructor or the learner so as to provide a desired volume of feedback.
Figure 4:
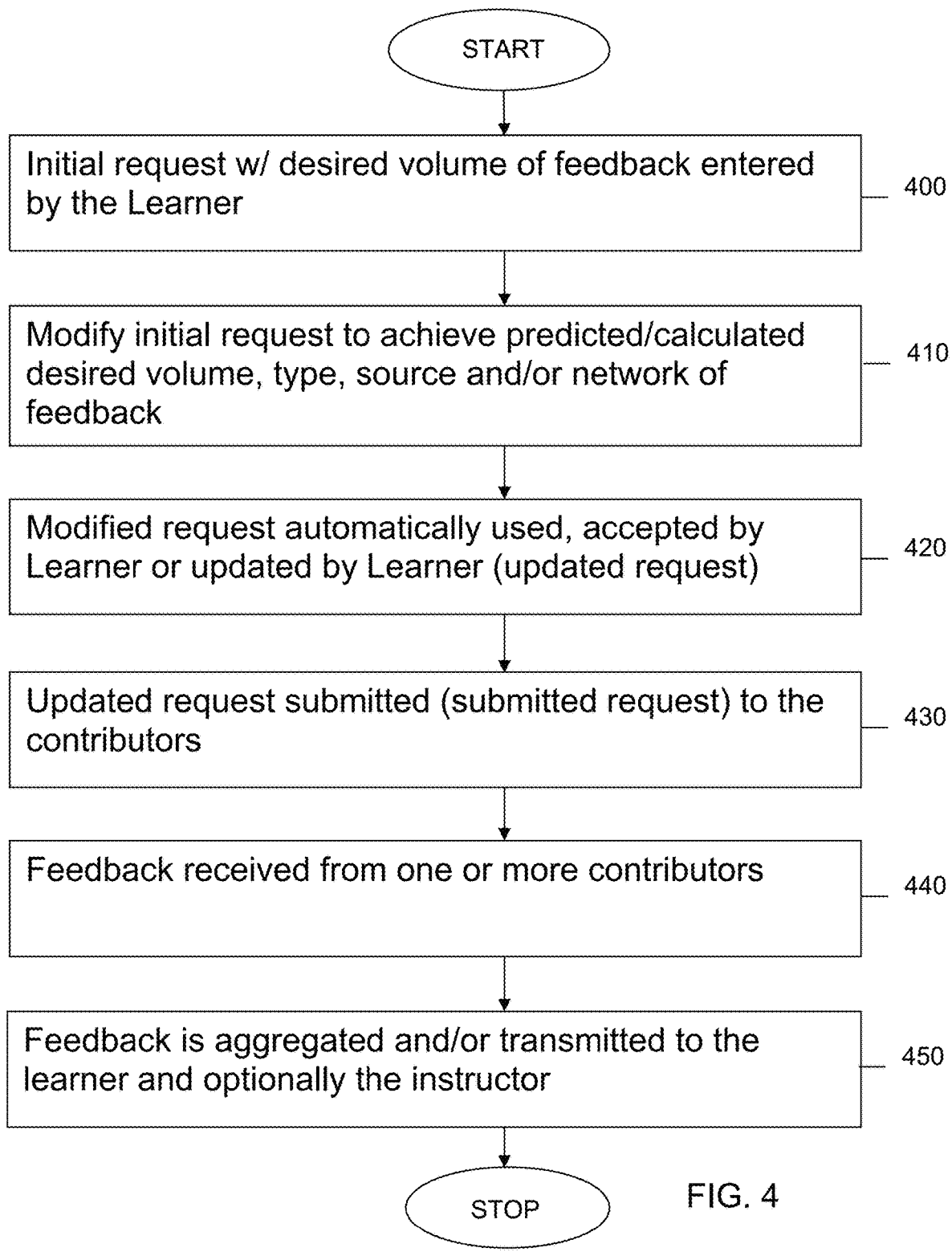
FIG. 4 illustrates a flow chart of a method that may be used to allows an instructor and/or a user on a client device to shape and request feedback over a computer network from a plurality of contributors on client devices. A request modifier may also modify a request for feedback from the instructor or the learner so as to provide a desired volume of feedback.
Figure 5:
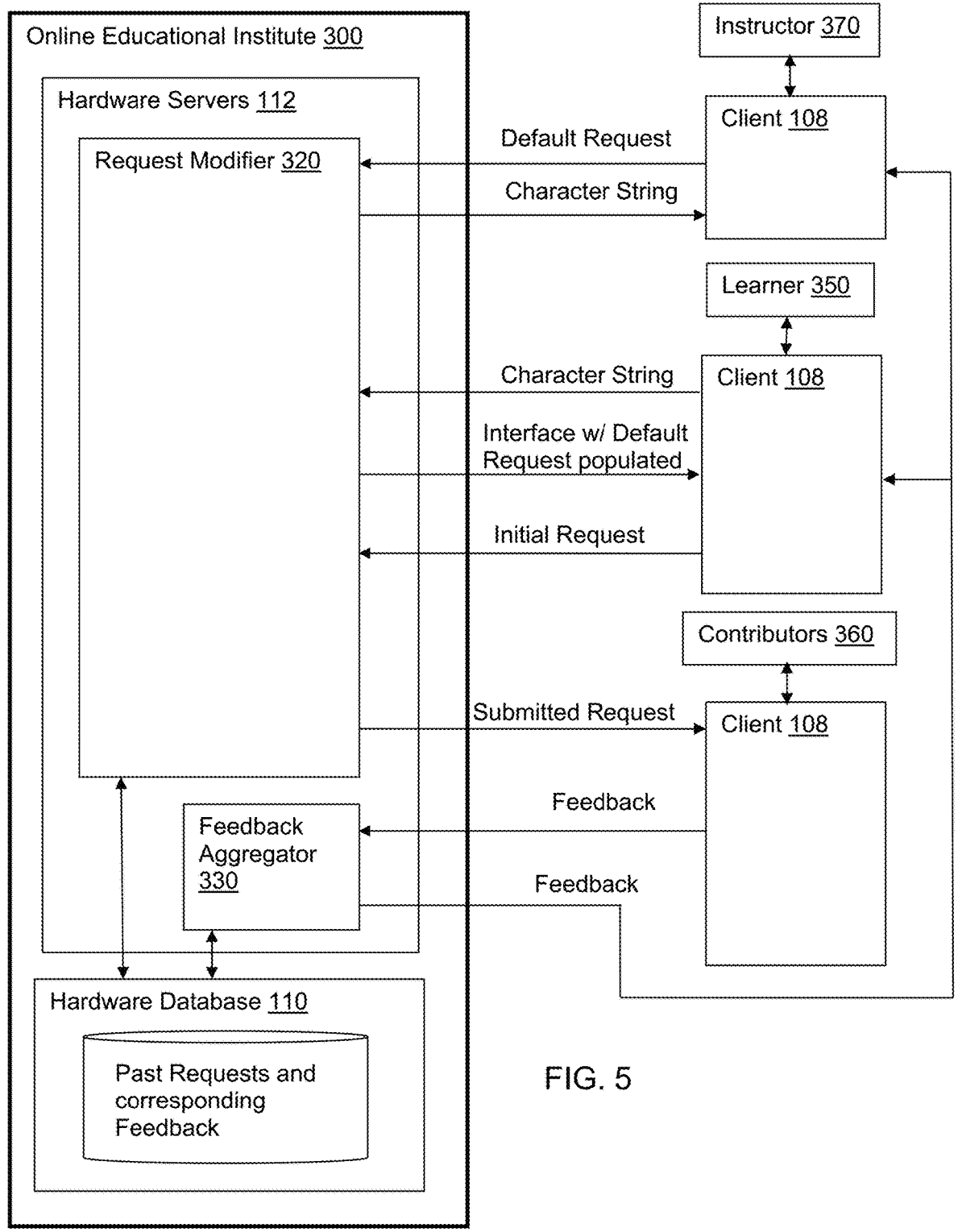
FIG. 5 illustrates a block diagram of a system that allows an instructor and/or a user on a client device to shape and request feedback over a computer network from a plurality of contributors on client devices.
Figure 6:
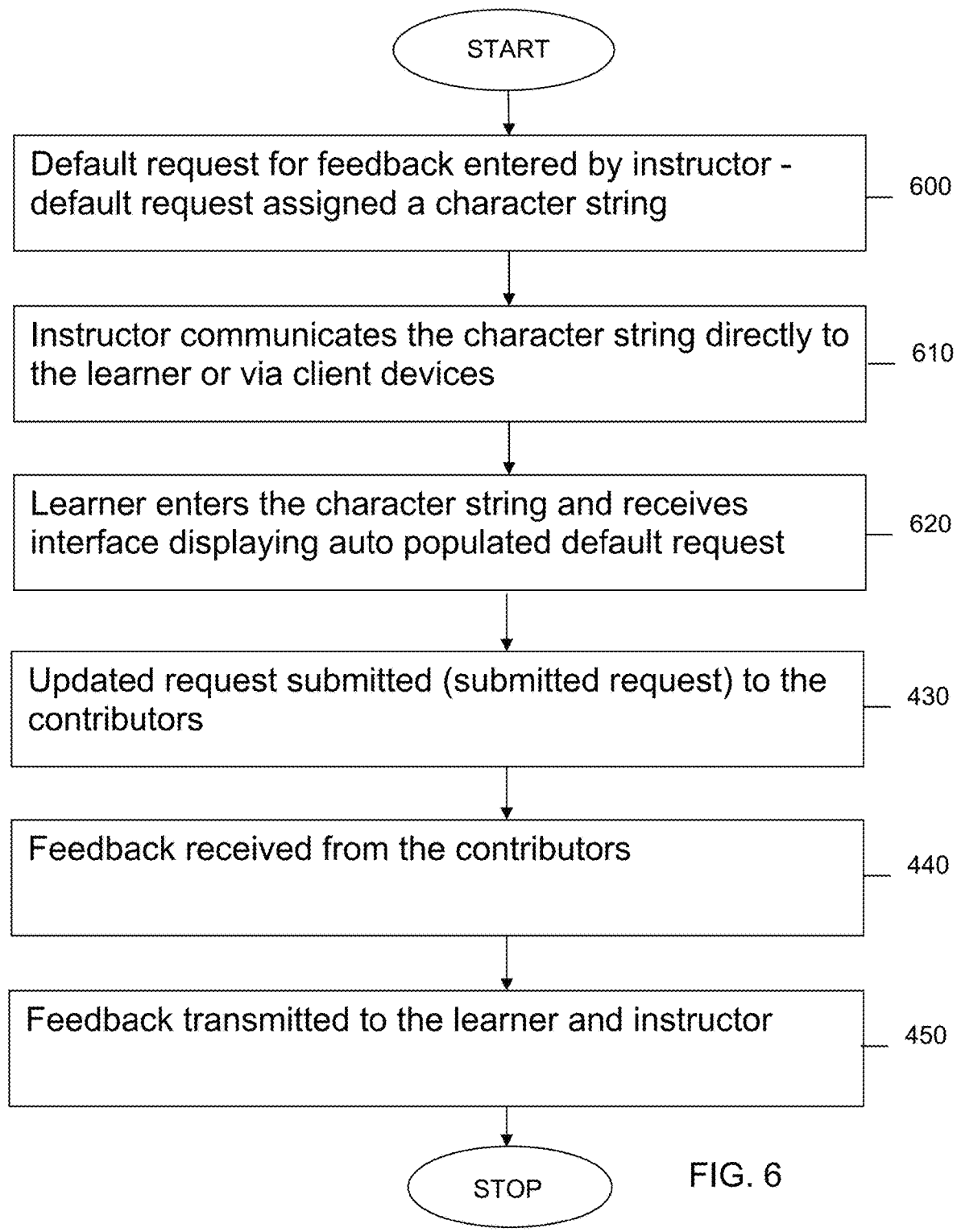
FIG. 6 illustrates a flow chart of a method that may be used to allows an instructor and/or a user on a client device to shape and request feedback over a computer network from a plurality of contributors on client devices.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices, clients, hardware servers or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Referring to FIGS. 3-6, systems and methods are illustrated for an instructor 370, i.e., a data source 370 and a learner 350, i.e., a feedback recipient 350, in an online educational institute 300, i.e., an online digital feedback network 300, to control the sources, type and quantity of feedback that the instructor 370 and learner 350 receive from one or more contributors 360 regarding a project the learner 350 is performing as a class assignment. It should be appreciated that while, in some embodiments, the instructor 370 and learners 350 may physically meet in a brick & mortar building or alternatively only in a virtual online class, the requests for feedback to the contributors 360 and the feedback from the contributors 360 to the learners 350 must be received via an online digital electronic computer network (such as the Internet).

The claimed invention is advantageous for the learner 350 as the learner 350 is able to manage the sources, type (quality) and quantity of feedback the learner 350 receives from one or more contributors 360. The improved feedback enhances the learning experience of the learner and may also provide the learner (preferably with the consent of the contributors 360) with a portfolio of projects that have been reviewed by a number of professionals in the same field as the project. The online educational institute 300, instructor 370 and learner 350 may all use the project and the feedback as marketing and promotional tools. In preferred embodiments, authorizations and/or notifications have been obtained from the instructor 370, the learner 350 and/or the contributors 360 whose material is being used as marketing or promotional tools.

The claimed invention is also advantageous for the instructor 370 as the feedback from the contributors 360 enhances the learning experience of the learners 350 in the instructor's class, i.e., learning group or group. The instructor 370 may request that projects only be turned in with specified types or volumes of feedback, may request that a draft, feedback on the draft and the final updated project be turned in or frame the requested feedback from the contributors 360. In addition, the aggregate feedback from the contributors 360 may be used by the instructor 370 in evaluating the course, using the feedback as insights from other experts in the field. Thus, the instructor may update the course based on the feedback from the contributors 360.

The claimed invention is also advantageous for the contributors 360 as the feedback provided by the contributors 360 enhances the contributors' digital reputation and builds networking contacts with the learners 350. The contributors 360 also see the latest academic work being done in their field and how the latest batch of learners 350 (students) are addressing the current issues.

An online educational institute 300 may be a legal entity in the business of providing educational classes, such as traditional and/or online digital classes, that include assigning projects. The online educational institute 300 comprises computer code running on one or more hardware servers 112 and other computer hardware, such as routers, that permit the online educational institute 300 to electronically communicate with their associated learners 350, contributors 360 and instructors 370. Each learner 350, contributor and instructor 370 may use a client 108 or client device 108 (such as a smartphone, tablet, laptop or desktop computer) to electronically communicate with the online educational institute 300.

The computer code of the online educational institute 300 may provide any number of different desired services. In one embodiment, the computer code of the online educational institute 300 comprises a request modifier 320 and a feedback aggregator 330. The request modifier 320 and feedback aggregator 330 may comprise one or more computer programs and/or computer software modules running on the one or more hardware servers 112 of the online educational institute 300.

The request modifier 320 may receive from a learner 350 an initial request for feedback from a plurality of contributors 360 and, optionally, a desired volume of feedback from the contributors 360. (Step 400) In other embodiments, a maximum number of contributors 360 providing feedback may be included and/or a date after which feedback can no longer be received from the contributors 360 may also be included with the request to the request modifier 320. The request modifier 320 may modify the initial request created by the learner 350 for feedback from a plurality of contributors 360. (Step 410) The request modifier 320 may make the modifications for any desired reason, such as the request from the learner 350 is accompanied by a desired volume (number of contributors 360 and/or amount of feedback) of feedback from the contributors 360.

The feedback aggregator 330 may be used to receive, aggregate and transmit the feedback from the contributors 360 to the learner 350 and/or instructor 370. The feedback aggregator 330 may store the request submitted to the contributors 360 and the feedback (or summary of the feedback, such as the number of contributors 360 that responded and/or the quantity of the feedback) in a hardware database 110 (also referred to as a data store 110). The request modifier 320 for future requests from the same or different learners 350 may use the request submitted to the contributors 360 and the feedback stored in the hardware database 110 to allow the request modifier 320 to modify requests so that the modified request submitted to the contributors 360 receives a desired volume of feedback as indicated by the learner 350. In some embodiments, the request modifier 320 may provide suggestions and/or defaults in a user interface (UI) as part of a user experience (UX) to scaffold the requesting process such that learners 350 are more likely to choose settings aligned with their feedback needs, i.e., requests with attributes predicted to yield the desired feedback, either by type, volume and/or deadline.

The online educational institute 300 may also comprise a hardware database 110 that allows the storage and retrieval of past requests (and the date created or submitted to the contributors 360) and the past requests' corresponding feedback (responses). This data may be entered into the hardware database 110 by the feedback aggregator 330 after every learner request receives feedback. In addition, the request modifier 320 may read and use the request and corresponding feedback to modify requests, either the request itself and/or the request making experience, from learners 350 for feedback from contributors 360 on the assumption that similar requests will receive a similar volume of feedback from contributors 360.

In another embodiment, the request modifier 320 of the online education institute 300 may transmit a first interface to a client device 108 of an instructor 370. The first interface may be configured to allow the client device 108 of the instructor 370 to enter a default request for the feedback for a project from client devices 108 of one or more contributors 360. The default request from the instructor 370 may be intended by the instructor 370 to be used by all of the learners in a class working on the project. The default request may comprise any factors desired by the instructor 370 for the project. As non-limiting examples, the default request (and all of the other described requests below) may comprise a feedback due date or a project due date, a project title or a project description, a suggested/required feedback type, a desired volume of feedback and/or one or more groups, with each group comprising a plurality of potential contributors 360.

The suggested feedback type may comprise any category of feedback desired by the instructor 370 and/or learner. As non-limiting examples, the suggested feedback type may be a scoring method of a positive or a negative reaction (thumbs up or thumbs down), a rating on a scale, ratings to various factors listed in a rubric, a drafting comments in a suggestions area and/or an annotated response to the material of the project. In addition, the suggested feedback type may ask for feedback (using any of the above mentioned scoring methods) on various aspects or factors of the project. As non-limiting examples, the aspects or factors of the project may comprise a writing skill, creativity, information literacy, visual design and/or critical thinking demonstrated by the learner 350 in performing the project. In some embodiments, the aspects or factors of the project may be created by the request modifier 320 based on skill maps related to the learner's career interest areas, that the learner 350 has received lower scores in the past and/or criteria the request modifier 320 predicts are relevant based on similar feedback requests. The request may request scores and/or comments on each of one or more aspects or factors of the project.

The request may include a desired volume of feedback. The desired volume of feedback may indicate a desired number of contributors 360 that provide feedback on a project of a learner 350 and/or a quality and quantity of feedback from one or more contributors 360. As a non-limiting example, the desired volume may comprise a request for at least three contributors to provide feedback comprising rating various factors of a project using a supplied rubric. In another embodiment, one or more types of feedback may have a minimum number of contributor feedback(s) and/or one or more types of feedback may have a maximum number of contributor feedback(s). As an example, the request may include a request for at least two annotated feedbacks and no quick reaction (thumbs up or thumbs down) feedbacks for the project.

The request may also include one or more groups of potential contributors 360 that may be contacted and asked to provide feedback to the learner 350 for the project. The contributors 360 may be organized into any desired group or number of groups. As non-limiting examples, the groups available for selection and the selected groups may be fellow learners, graduate students, other instructors 370, alumni from the online educational institute 300, alumni from other educational institutes, professional groups (preferably related to the project in some manner), contributor volunteers and/or professionals working in a field related to the project. The request may also include one or more specific individuals to request for feedback as desired contributors 360. In some embodiments, a contributor group request may be required or preferred. Learners may be given the choice (either always provided or only after earning a certain status in the system.)

The request may also include a contributor rating, wherein only contributors 360 in the selected groups having the contributor rating or higher receive a request for feedback from the request modifier 320. In this manner, the instructor 370 or learner 350 making the request may limit the feedback to be only from contributors 360 that have previously been rated (possibly by other contributors 360, instructors 370 and/or learners 350) as having the specified contributor rating. In some embodiments, the request might only include the minimum contributor rating based on a predetermined number of feedback requests of different types.

The contributor rating may be based on any desired metric. As non-limiting examples, the contributor rating may be based on metrics such as: 1) quality of feedback contributions, including learner ratings and how your feedback relates to the feedback of others with credibility over time; 2) quantity of feedback contributions over time; 3) types of feedback contributed; 4) feedback types the learners find most useful are prioritized on an ongoing dynamic basis; 5) a combination of response types would earn status, this may be whatever the system shows strikes the right balance (for learners and contributors) between contributing to the system and with quicker ratings (thumbs up/down) and providing open-ended response types; 6) demand level of the learner's network, i.e. contributors from more highly requested networks earn higher status; and 7) willingness to share quote and name of the contributor 360 to allow the learner 350 to reference that in a portfolio of the learner 350.

The request modifier 320 may assign a character string to the default request entered by the instructor 370. (Step 600) As an example, the instructor 370 may enter in the first interface that the feedback due date is September 1st, the project title is "public relations pitch deck for new community center," the suggested feedback type is completing (writing comments in) a suggestions area for the project, the selected groups are "graduate students" and "PR professionals" and the desired volume of feedback is at least two contributors 360 providing feedback. The request modifier 320 may assign a character string of "PR101Feedback" and display the character string on the client device 108 of the instructor 370. The instructor 370 may inform the learners 350 in their class, either in person or over their client devices 108, that a default request has been entered into the request modifier 320 and the learners 350 can access the default request in the request modifier 320 with the character string of "PR101Feedback." (Step 610)

Figure 7:
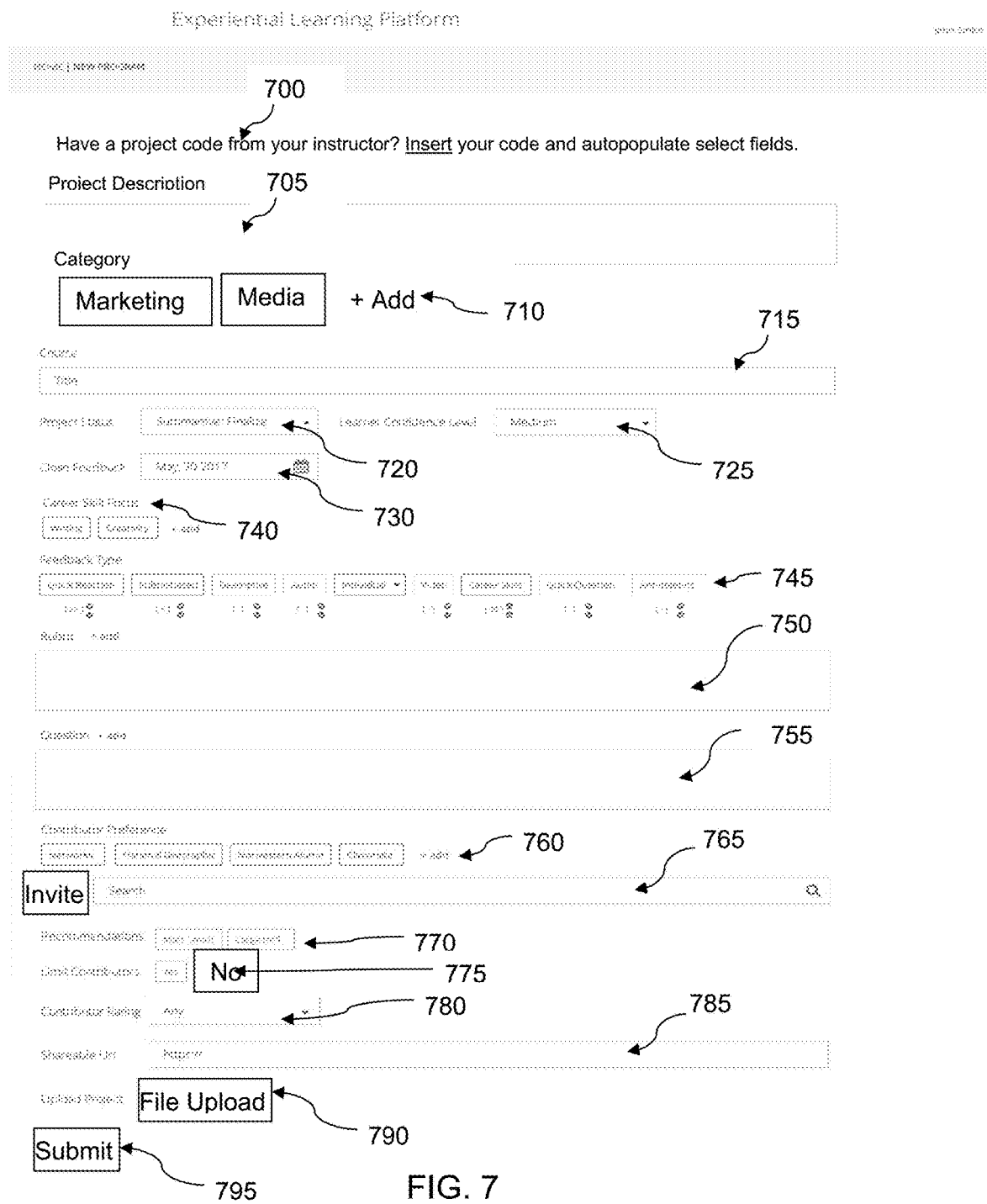
FIG. 7 illustrates a possible interface that may be displayed by a request modifier of an online educational institute to a client device of an instructor to enter a default request or a client device of a learner to enter an initial request.
Figure 8:
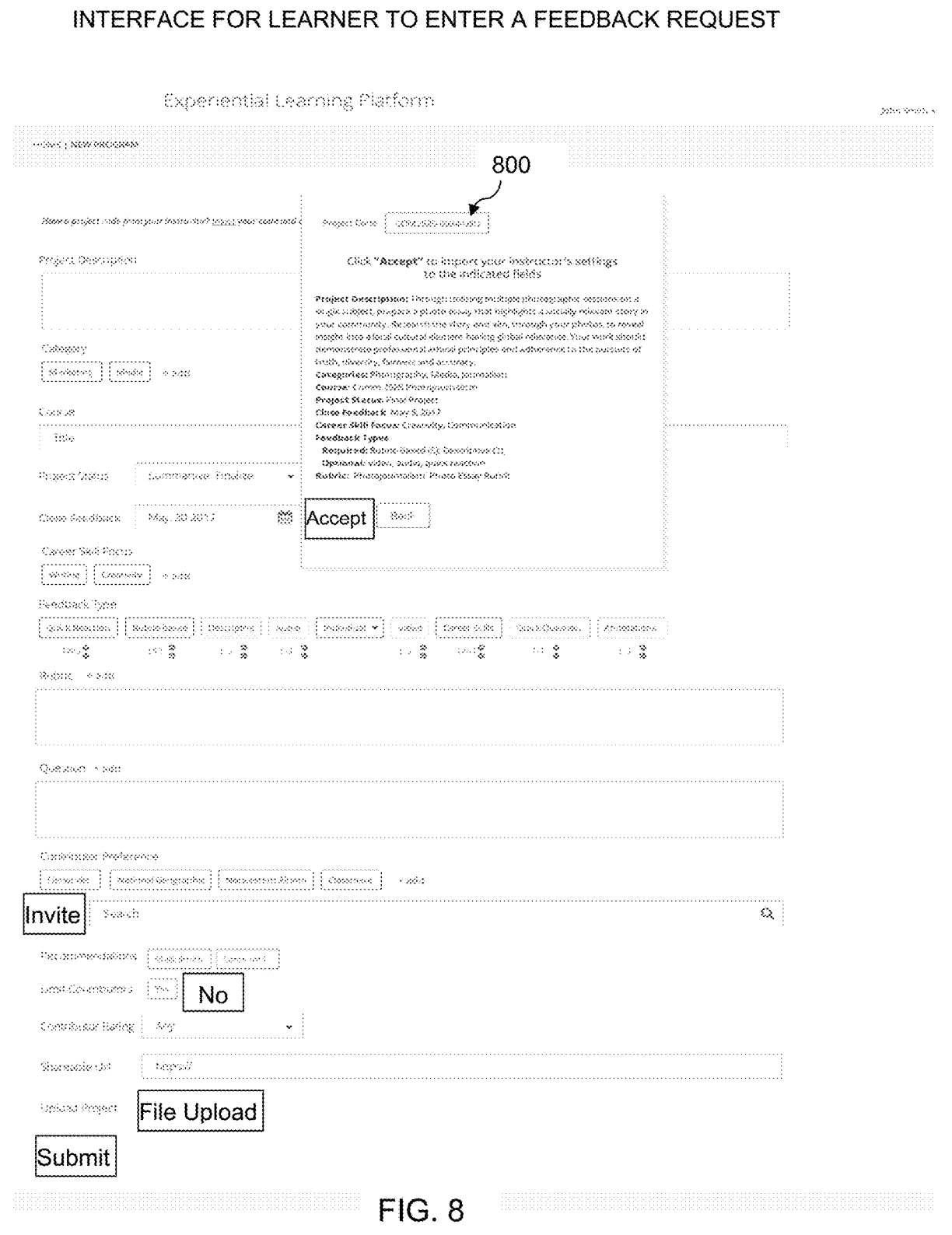

FIG. 7 illustrates an interface that may be displayed on a client device 106 of a learner 350. If the instructor 370 provided a character string for a project, the leaner 350 may select, as a non-limiting example, the hyper link 700 so that the learner may enter the character string in a field (such as the pop-up field 800 illustrated in FIG. 8). The learners 350, having received the character string for a default request from the instructor 370, may electronically submit the character string from their client to the request modifier 320. (Step 620) Thus, continuing with the example, the client device 108 of the learner 350 may transmit the character string "PR101Feedback" to the request modifier 320.

The request modifier 320 may electronically transmit a second interface to the client device 108 of the learner 350. The second interface preferably displays to the client device 108 of the learner 350 the default request entered by the instructor 370. The default request may be auto populated into various fields displayed on the second interface to the client device 108 of the learner 350. The second interface may be configured so that the learner 350 may not change the default request so that the learner 350 has to use the default request entered by the instructor 370.

In another embodiment, the second interface may allow the learner 350 to modify the default request entered by the instructor 370. The second interface may allow the client device 108 of the learner 350 to enter an initial request, different from the default request entered by the instructor 370, for the feedback for the project from client devices 108 of the plurality of contributors 360 to the learner 350. (Step 420) As a non-limiting example, FIG. 7 illustrates an interface that may be used by a learner 350 to enter an initial request (a similar interface may be used by the instructor 370 to enter the default request). The learner 350, using a client device 106, may enter: a project description in field 705; enter or select one or more categories in section or fields 710; may enter a course title in field 715; enter or select a project status at menu 720; enter or select a learner confidence level at field or menu 725; enter or select a close feedback date in field 730; enter or select one or more career skill focuses of the learner 350 in field 740; enter or select one or more preferred or allowed types of feedback, such as quick reaction, rubric-based, descriptive, audio, individual, video, career skills, quick question, annotations on a written project in section 745; enter a rubric (if one is to be used by contributors 360 for the project) in field 750; enter a question to be answered by the contributors 360 regarding the project in field 755; enter or select one or more groups from which to select contributors in field 760; enter a search query to search for a contributor 360 for the project in field 765; select zero, one or more recommendations as contributors 360 in field 770; limit the number of selected contributors 360 in filed 775, possibly to those having at least the contributor rating entered or selected in field 780; enter a sharable URL for the contributors 360 relevant to the feedback request for the project in field 785; upload the project to the request modifier 320 in field 790 to permit access to the project by the contributors 360; and select submit the initial request in field 795 so that the request modifier 320 may submit the created and/or modified request to the client devices 106 of the contributors 360.

In another embodiment, the learner 350 may create an initial request that comprises, as non-limiting examples, the feedback due date or the project due date, the project title or the project description, the suggested feedback type, the desired volume of feedback and one or more groups, each group comprising a plurality of potential contributors 360. (Step 400)

In another embodiment the instructor 370 does not create a default request nor does the instructor 370 provide the learners 350 an associated character string as each learner 350 from a client device 108 may enter and customize an initial request on their own using the second interface. In this embodiment, the learner 350 may create an initial request that comprises, as non-limiting examples, the feedback due date or the project due date, the project title or the project description, the suggested feedback type, the desired volume of feedback and one or more groups, each group comprising a plurality of potential contributors 360.

The request modifier 320 may electronically receive a plurality of past requests and a corresponding plurality of past feedback from a hardware database 110. The request modifier 320 may determine a plurality of most similar past requests to the initial request in the plurality of past requests. The request modifier 320 may use any desired method of comparing and determining which past requests are most similar to the initial request.

As one possible non-limiting example, the request modifier 320 may determine the past requests that are most similar to the initial request by determining a distance in high dimensional space between the initial request and each past request in the plurality of past requests. For this example, each factor that may be modified in a request may be assigned a number in a dimension. As non-limiting examples, the due date may be assigned a number representing the number of days between submitting the request to the contributors 360 and the due date for the feedback.

The date of the requested feedback may also be assigned a number as the amount of feedback from different contributors 360 may change over time. Thus, the date of each request should also be tracked as a dimension in high dimensional space.

The project title or project description may be parsed for subject words (such as marketing) and each subject word may be assigned a number. In preferred embodiments, subjects that are closer to each other are assigned numbers that are closer to each other.

The suggested feedback may be assigned the number one for a scoring method of a positive or a negative reaction (thumbs up or thumbs down), a two for a rating on a scale, a three for ratings to various factors listed in a rubric, a four for a drafting comments in a suggestions area and a five for an annotated response to the material of the project. In some embodiments, the comments may be in a video and/or an audio format. If audio is used, the audio may be converted to text which could be displayed to the learner 350 as comments. Alternatively, or in addition, the video may also be converted to text which could be displayed to the learner 350.

The one or more selected contributor groups may be assigned a one for fellow learners, a two for graduate students, a three for other instructors 370, a four for alumni from the online educational institute 300, a five for alumni from other educational institutes, a six for professional groups (preferably related to the project in some manner), and a seven for professionals working in a field related to the project. If multiple groups are selected, as a non-limiting example, their values may be added together or a plurality (such as four) of dimensions may be reserved for the groups selected. If fewer groups are selected than the number of dimensions reserved for groups, not used dimensions may be assigned a default value, such as zero.

The order of each factor as a dimension may be any desired order, but the order should be kept consistent between the current requests and all past requests. In this manner, the current initial request and all past requests may be placed in high dimensional space.

The request modifier 320 may select as the plurality of most similar past requests the past requests in the plurality of past requests (that have been saved in the hardware database 110) with the smallest determined distance in high dimensional space with the initial request. The distance between the initial request and past requests may be calculated by subtracting their positions from each other in high dimensional space.

While any number of similar past requests may be selected, as a specific example, the 10 closest past requests to the initial request may be selected and their volumes of feedback (number of contributors 360, quality ratings and/or quantity of feedback) may be averaged. The average volume of feedback for the closest past requests to the initial request may be taken as a predicted volume of feedback for the initial request.

The request modifier 320 may assign a predicted volume of feedback for the initial request based on an average volume of past feedback for the plurality of most similar past requests. This method assumes that similar requests will receive similar volumes of feedback.

In some embodiments, the request modifier 320 may modify the initial request to generate a modified request so that the modified request is predicted to receive a volume of feedback closer to the desired volume of feedback than the predicted volume of feedback for the initial request.

As an example, if the desired volume of feedback is greater than the predicted volume of feedback for the initial request, the initial request may be modified by any desired means that is likely to increase the volume of predicted feedback. The initial request may be modified to receive more feedback by, as non-limiting examples, selecting a larger group, increasing the number of groups selected and/or selecting groups that are known to have more contributors 360 that are likely to contribute feedback. As another non-limiting example, the initial request may be modified so that the requested type of feedback is easier to complete. Thus, an initial request asking for annotated comments may be modified to ask for a quick reaction, such as a thumbs up or a thumbs down assuming more contributors 360 are likely to participate if the required feedback is easier or quicker to produce by the contributors 360. In some embodiments, the modified request may be analyzed as the initial request was analyzed to determine a predicted volume of feedback for the modified request. The modified request in this embodiment may be repeatedly modified until the predicted volume of feedback for the modified request is within a predetermined distance from the desired volume of feedback or a predetermined time or number of modifications have been attempted.

As another example, if the desired volume of feedback is less than the predicted volume of feedback for the initial request, the initial request may be modified by any desired means that is likely to decrease the volume of predicted feedback. The initial request may be modified to receive less feedback by, as non-limiting examples, selecting a smaller group, decreasing the number of groups selected and/or selecting groups that are known to have fewer contributors 360 that are likely to contribute feedback. As another non-limiting example, the initial request may be modified so that the requested type of feedback is harder (but better for the educational experience of the learner 350) to complete. Thus, an initial request asking for a thumbs up or thumbs down reaction may be changed to request annotated comments. In some embodiments, the modified request may be analyzed as the initial request was analyzed to determine a predicted volume of feedback for the modified request. The modified request in this embodiment may be repeatedly modified until the predicted volume of feedback for the modified request is within a predetermined distance from the desired volume of feedback or a predetermined time or number of modifications have been attempted. It should be appreciated that the request modifier 320 may be automatically making the modifications to the modified request with or without approval from the learner 350, possibly based on settings selected or approved by the learner 350.

In preferred embodiments, if the default request or the initial request for feedback entered by the learner 350 is modified, the modified request, preferably highlighting the changes, may be displayed to the learner 350 for the learner's approval. In preferred embodiments, a high level explanation for the reason for the change may be displayed to the learner 350. If the learner 350 does not approve the modified request, the original default request or the initial request may be used for submittal to the selected group(s) of contributors 360. If the learner 350 does approve the modified request, the modified request may be used for submittal to the selected group(s) of contributors 360. (Step 420)

It should be noted that in some embodiments the instructor's default request must be used by the learners 350. In other embodiments, the instructor's default request may be modified by the learners 350. In other embodiments, the instructor 370 does not enter a default request and the learner 350 may select the initial request for feedback from the contributors 360 using menus, fields and/or selection tabs on an interface displayed on the client of the learner 350. In preferred embodiments, the instructor 370 is able to select whether the default request entered by the instructor 370 is mandatory, the default request may be modified or the learners 350 must enter their own initial request.

It should be appreciated that in some embodiments the default request entered by the instructor 370 may be used without being modified (or even attempted to be modified) to receive a desired volume of feedback and/or modified by the learners 350. In other embodiments, an initial request entered by a learner 350 may be used without being modified (or even attempted to be modified) to receive a desired volume of feedback from the contributors 360. Thus, the request modifier 320 may electronically transmit the default request, the initial request or the modified request to the selected contributors 360, thereby requesting feedback from the contributors 360 for the project of the learner 350. (Step 430)

Figure 9:
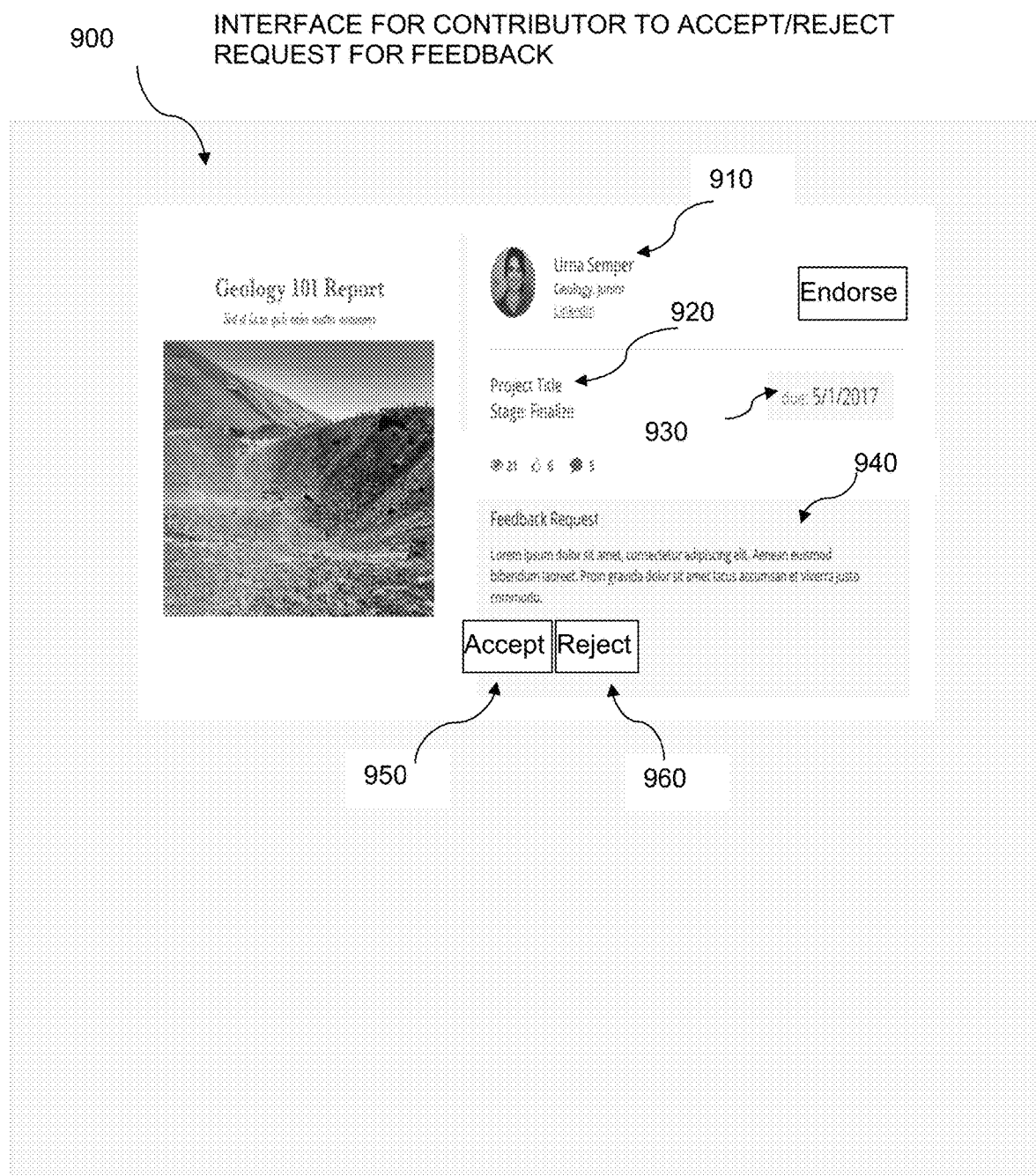
FIG. 9 illustrates a possible interface that may be electronically communicated to a client device of a contributor requesting that the contributor provide feedback to the described project of the identified learner and allowing the contributor to accept or reject the request.

In a preferred embodiment, each selected contributor 106 is given an option to accept or reject a request for feedback from the learner 350 regarding a project. As an example, FIG. 9 illustrates an interface communicated to a client device 106 of a contributor 360 that displays the name (and optionally picture or video) of the learner 910, a project title or stage of the project 920, a due date for the feedback on the project 930, and feedback request instructions regarding the type of feedback the learner 350 is requesting from the contributor 360 as shown in field 940. The interface may also have an accept button 950 and a reject button 960 so that the contributor 360 may easily accept or reject the request to provide feedback for the project. In this manner, the request modifier 320 may send requests to additional contributors 370 if too many of the contributors 370 are rejecting the request for feedback for the project for the learner 350.

Each contributor 360 preferably has options, via settings the contributor 360 has selected, to control the types, frequency, volume and request categories and characteristics (such as institution, year in school, major(s), subject areas, etc.) that the contributor 360 is willing to provide feedback. The system preferably does not request feedback from a contributor 360 that is not within the settings or bounds selected by the contributor 360. In other embodiments, each contributor 360 may search for outstanding feedback requests and volunteer to provide feedback for as few or as many feedback requests as desired by the contributor 360 (as long as the contributor 360 meets the minimum qualifications as requested by the learner 350).

In preferred embodiments, the selected contributors 360 that have received a request for feedback may receive an interface from which to review the project of the learner 350 and from which to enter feedback regarding the project of the learner 350. The interface preferably informs the contributors 360 of the date by which the feedback must be entered and the type of feedback desired by the instructor 370 or learner 350, e.g., a scoring method of a positive or a negative reaction (thumbs up or thumbs down), a rating on a scale, a ratings for various factors listed in a displayed rubric in the interface, comments in a suggestions area or an annotated response to the material of the project. In some embodiments, only means for entering the desired type of feedback are presented to the contributors 360 on the interface.

Figure 10:
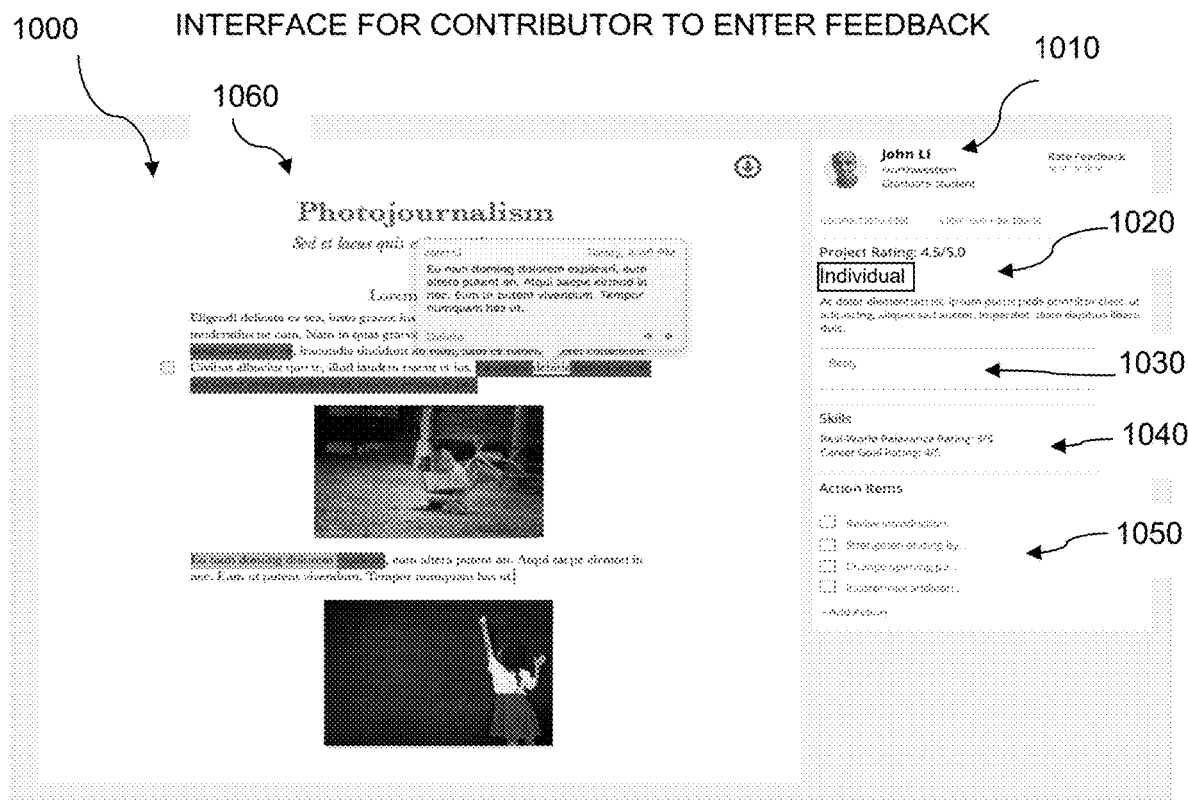
FIG. 10 illustrates a possible interface displayed on a client device for a contributor to enter feedback for the project of the learner.

FIG. 10 illustrates an interface for a contributor 360 to enter annotated comments in field 106. The contributor 360 may be identified in field 101, a project rating may be identified in field 1020, comments may be entered by the contributor 360 in field 1030, the skills as selected by the contributor 360 may be displayed in field 1040 and one or more predefined action items may be displayed in field 1050 for the contributor 360 to select, thereby making the review and feedback process for the contributor 360 easier to complete.

If the type of requested feedback is rating various factors listed in a rubric, the rubric may be displayed on the interface with means of rating (such as selecting a number or letter on a scale) each factor (such as creativity or writing skill) listed in the rubric, but in this embodiment other rating methods would not be displayed on the interface. In this manner a feedback aggregator 330 may electronically receive the desired type of feedback from the clients of the plurality of contributors 360. (Step 440)

Figure 11:
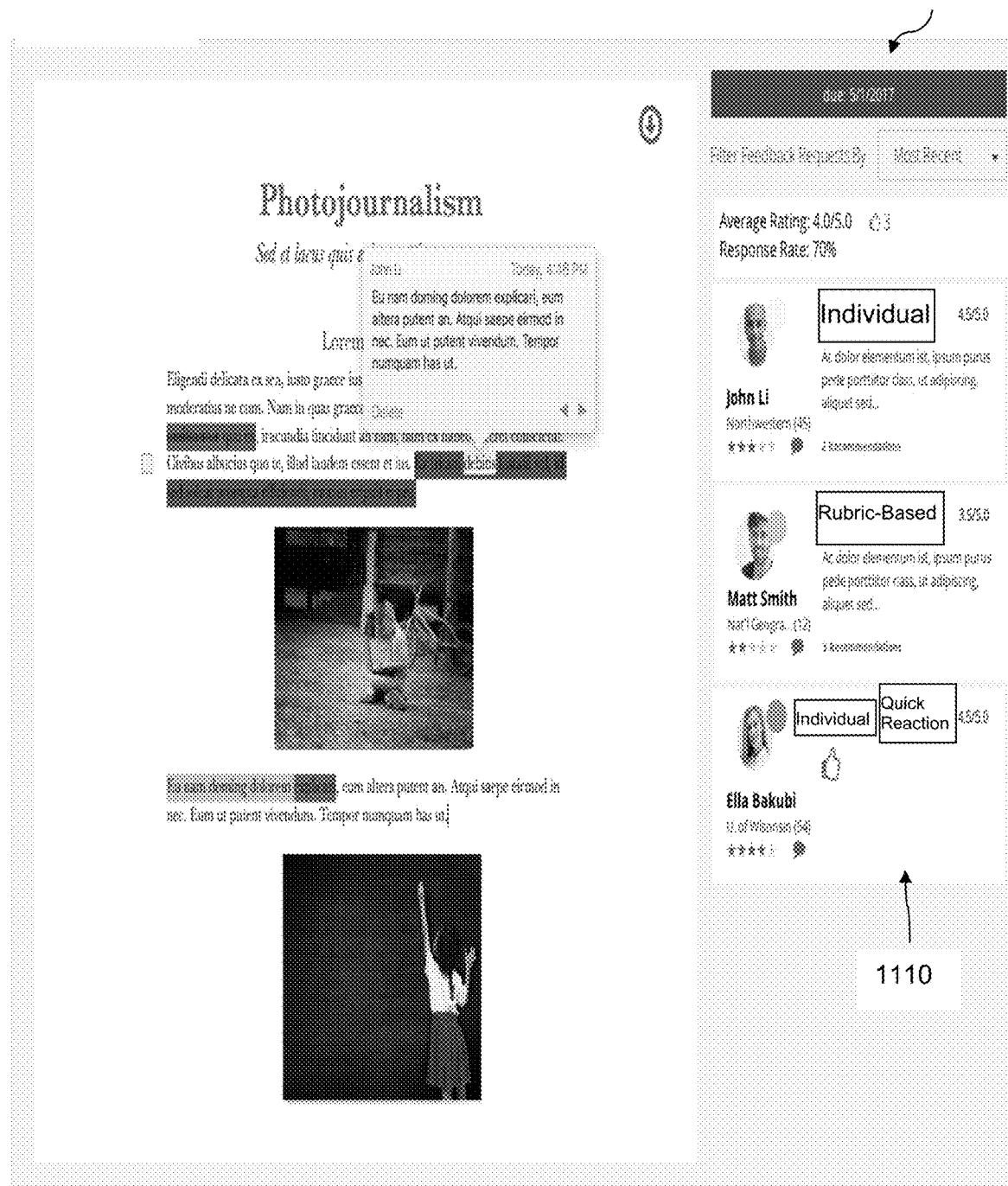
FIG. 11 illustrates a possible interface for a feedback aggregator to summarize the feedback received from a plurality of contributors to a client device of an instructor and a learner.

FIG. 11 illustrates an interface that may be displayed on a client device 106 of a learner 350 that displays the feedback from one or more contributors. In this example interface 1100, three contributors 360 are listed (John Li, Matt Smith and Ella Bakubi), each with different contributor ratings and using different types of feedback. The interface also provides statistics on the average rating from the contributors 360 and the response rate of the contributors 360 for the project of the learner 350

The feedback aggregator 330 may perform various statistical analysis on the feedback, such as percentage of contributors 360 receiving the submitted request that actually provided feedback and/or the average scores of the contributors 360 for the project. The feedback aggregator 330 may also combine all the comments or suggestions from the different contributors 360 onto a single interface or web page, for easy viewing on a client device 106 by the instructor 370 and/or learner 350. The feedback aggregator 330 may make available and display the feedback to the instructor 370 and learner 350 by electronically generating and transmitting an interface displaying the plurality of feedback from the plurality of contributors 360 to the client device 106 of the learner 350 and a client device 106 of an instructor 370 for the project. (Step 450) In some embodiments, the learner 350 may tag one or more feedbacks from the contributors (or portions thereof) which may be automatically shared with the instructor 370.

Figure 12:
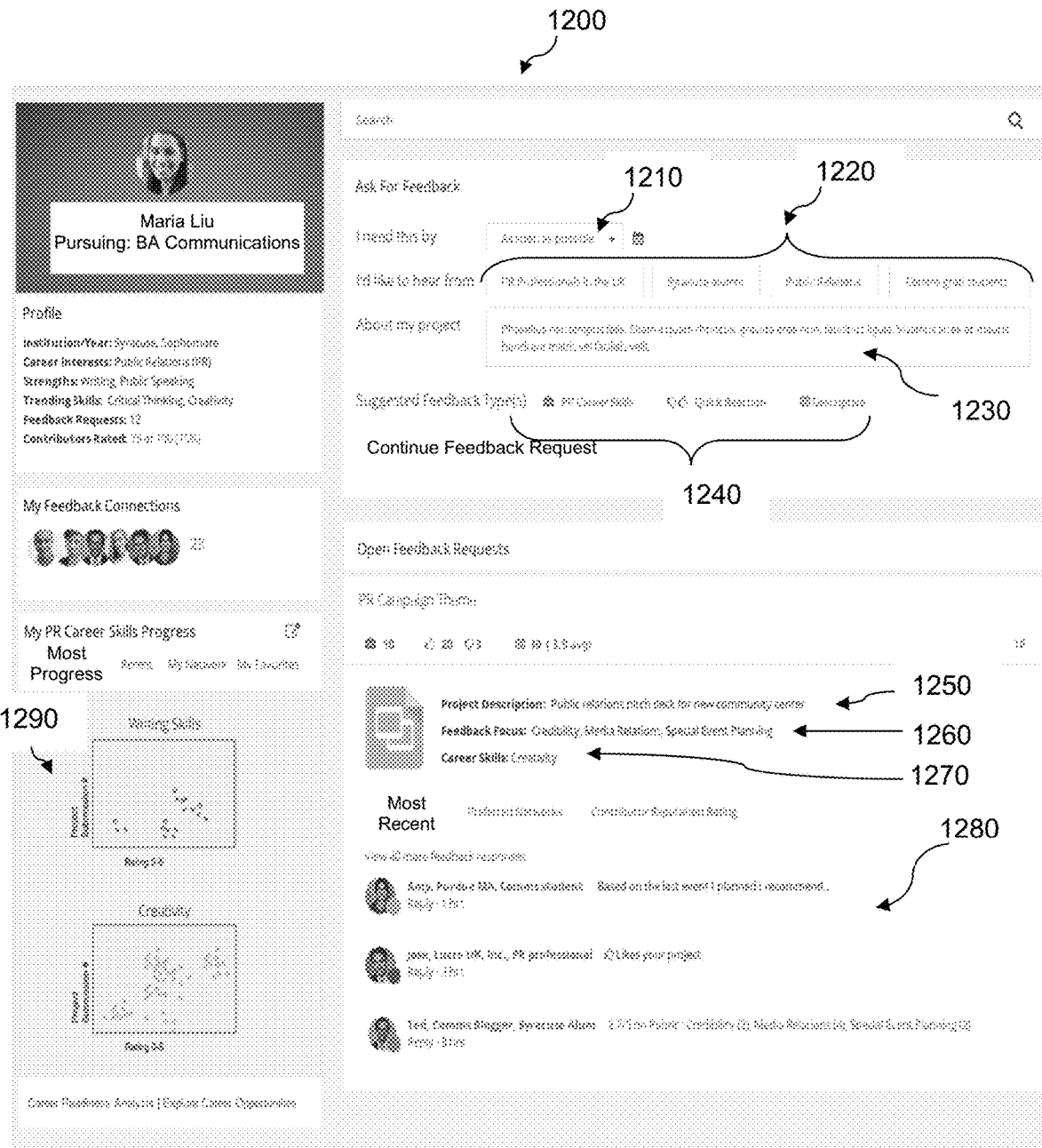
FIG. 12 illustrates a possible interface that may be displayed by the online educational institute on a client device of a learner to receive feedback or a client device of a contributor to enter feedback on a project.

FIG. 12 illustrates an interface 1200 that lists when the feedback is needed in field 1210, the selected one or more groups listed in field 1220, a description of the project in field 1230, the suggested feedback type(s) in field 1240, a project description in field 1250, a feedback focus listed in field 1260, a career skills listed in field 1270, and a plurality of feedback from contributors 360 in field 1280. Graphs 1290 may also be displayed showing the ratings from contributors 360 for various skills of the learner 350 displayed in the performance of the project. Graphs 1290 may also represent scores for all projects submitted by the learner 350 with feedback ratings tied to that skill. In addition or alternatively, a graph may also be used to visualize the data for each project's related career.

In preferred embodiments, each learner 350 only receives an interface that has feedback specifically for the project of the learner 350. In other words, learners 350 preferably do not see feedback intended for other learners 350. In some embodiments, for a common project performed by a group, i.e., a plurality of learners 350, each member of the group may see feedback regarding the common project. The instructor 370 is preferably able to see the feedback received by all of the learners 350 for the project in the instructor's class. In other embodiments, the learner 350 and/or contributors 370 may have to affirmatively give permission to the instructor 370 before the instructor may see the contributors' feedback.

Figure 13:
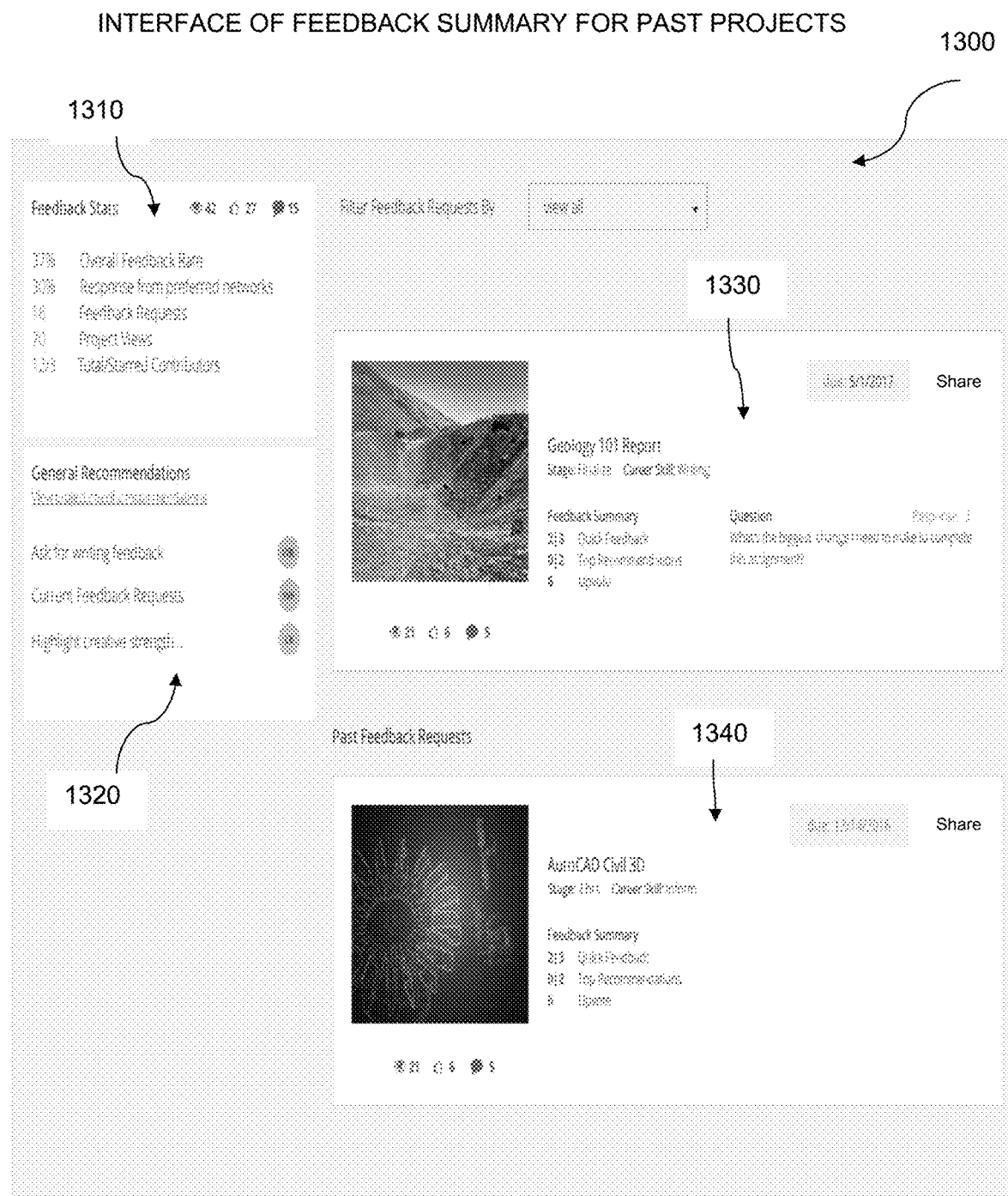
FIG. 13 illustrates a possible interface for the instructor or learner to receive on a client device an aggregate view and/or summary view of the feedback received from a plurality of contributors.

FIG. 13 illustrates a generated interface 1300 displaying feedback summary for a plurality of past projects 1330 and 1340. In this example illustration electronically communicated to the client device 106 of the learner 350, a feedback status 1310 is displayed showing, as non-limiting examples, a percentage of overall feedback rate, a percentage of responses from preferred networks, a number of feedback requests, a number of project views and a number of total and starred contributors 360.

The feedback aggregator 330 may electronically store the submitted request (the request actually electronically sent to the contributors 360) and the plurality of feedback from the plurality of contributors 360 or a summary of the feedback in the hardware database 110. Thus, over time the request modifier 320 and feedback aggregator 330 of the online educational institute 300 will have access to an ever increasing hardware database 110 of submitted requests and the feedback received from those submitted requests which may be used to modify future initial requests to get improved feedback, such as the type of desired feedback or the volume of desired feedback for the learners 350.

In another embodiment, the feedback from each contributor for each learner 350 may be used to calculate various skill levels of the learner 350. As non-limiting examples, the skills of writing and/or creativity may be evaluated and scored by a plurality of contributors 360. The scores may be normalized based on the past scores of the contributors 360 (thus learners 350 with harder grading contributors 360 are not unfairly punished and learners 350 with easier grading contributors 360 are not unfairly rewarded) and averaged to give each learner 350 a score for a plurality of different skills. The scores and associated skills may be displayed to the learner 350.

Figure 14:
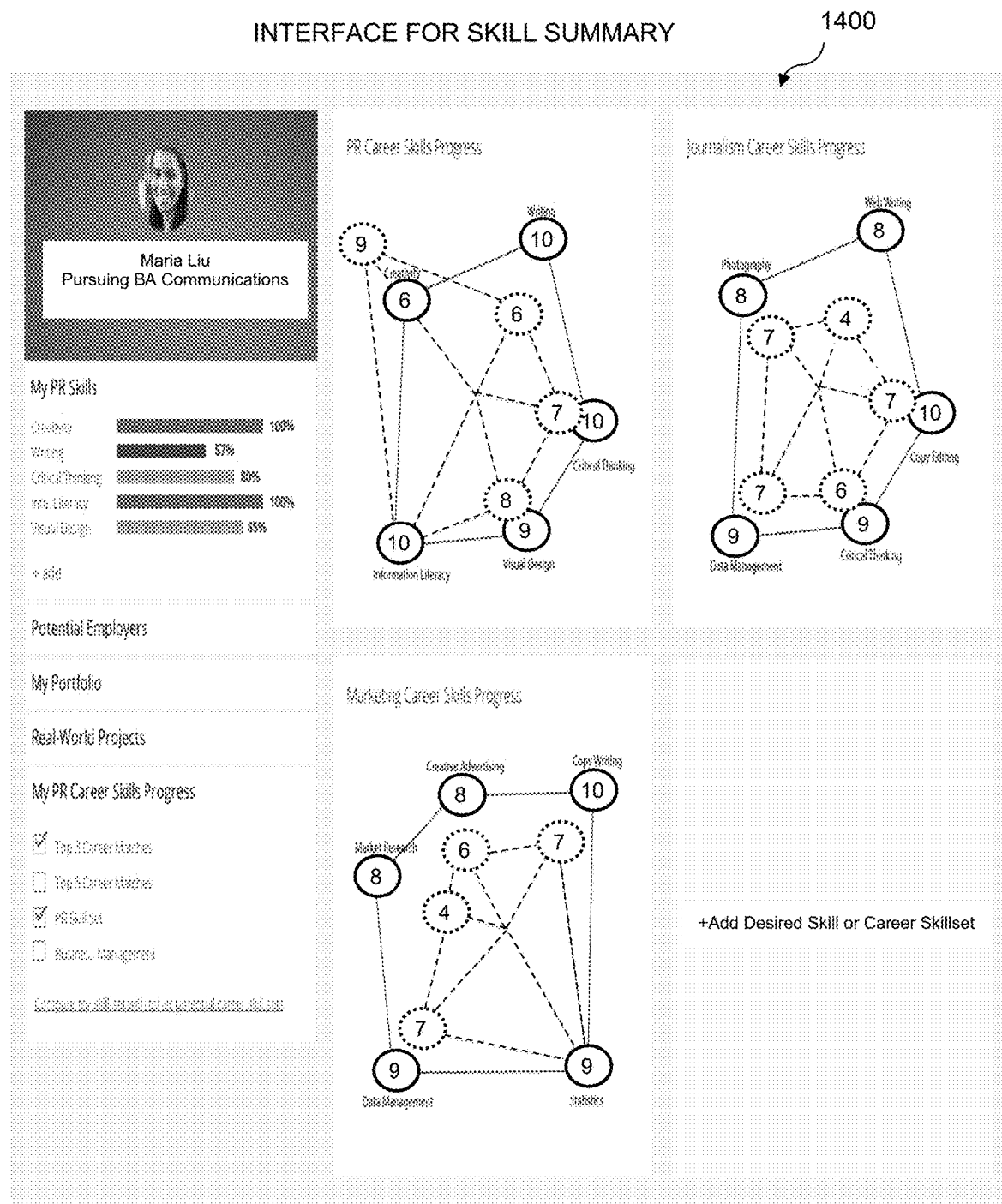
FIG. 14 illustrates a possible interface for the instructor or learner to receive on a client device that compares the learner's skills in a plurality of areas with the known necessary skills for different career or employment positions.
Figure 15:
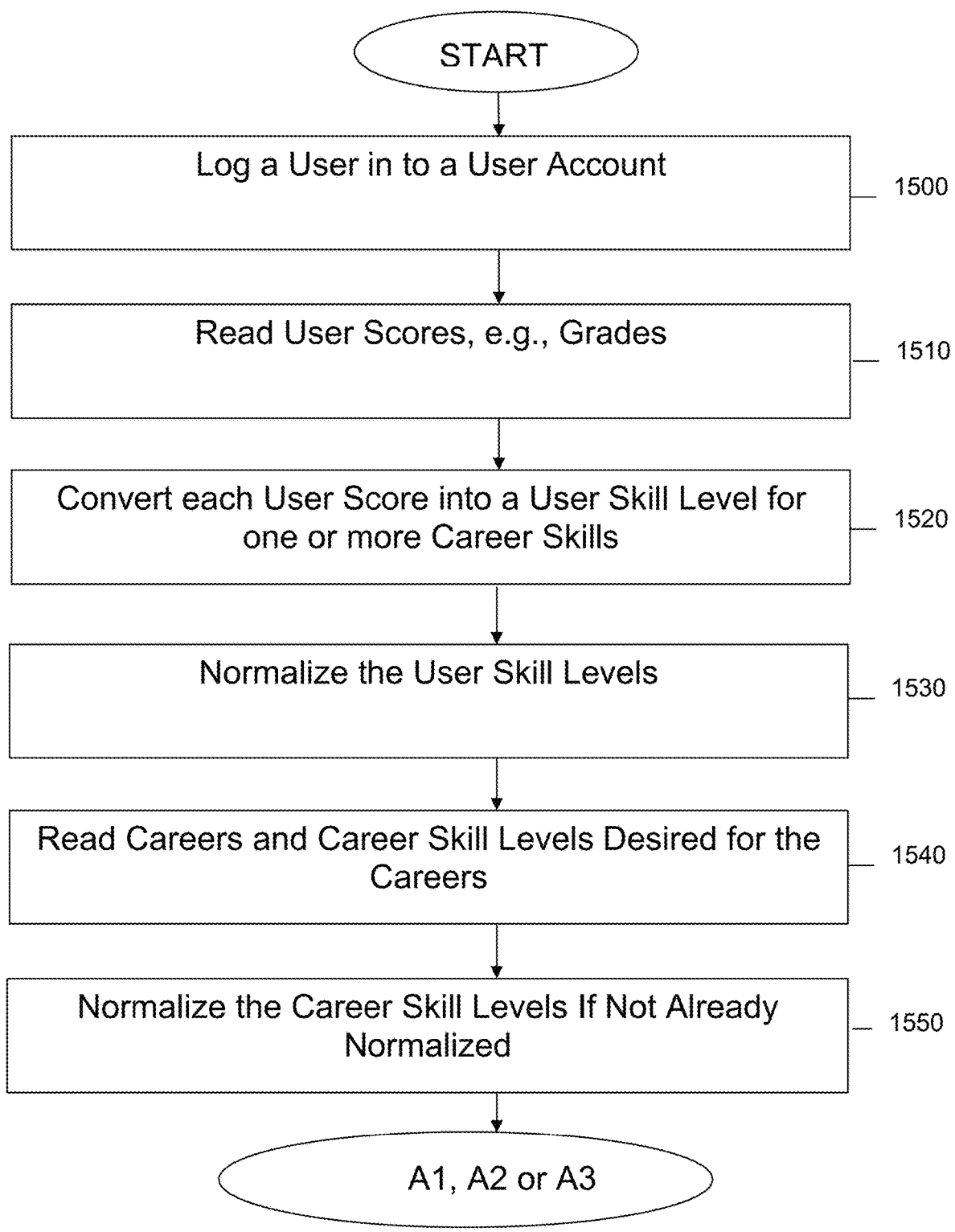
FIGS. 15-19 illustrate three different methods for presenting a visualization of normalized user skill levels vs. normalized career skill levels for a plurality of career skills essential for a particular career and recommending one or more actions to mitigate any deficiencies in the normalized user skill levels.
Figure 16:
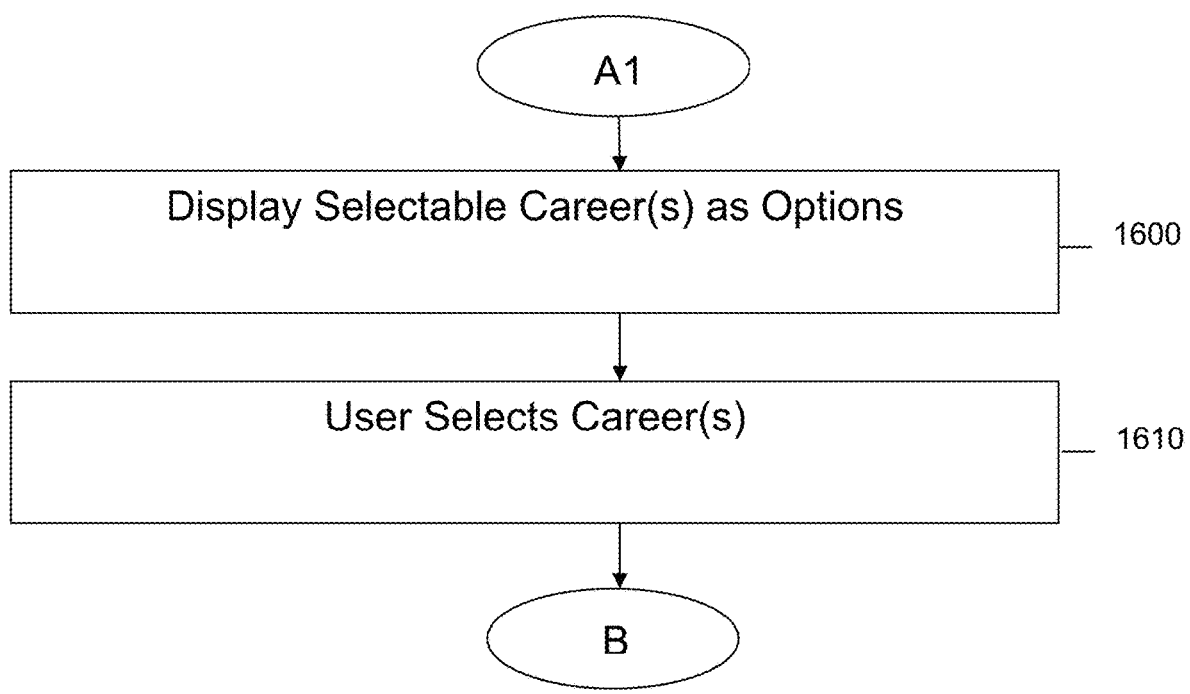
Figure 17:
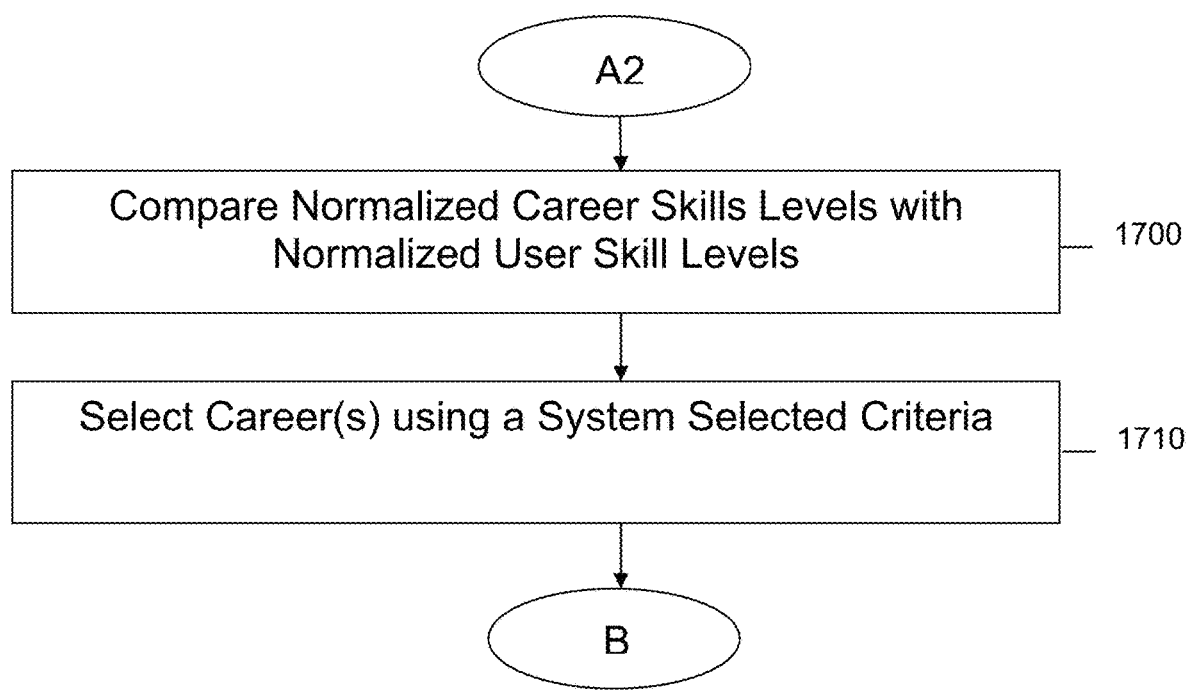
Figure 18:
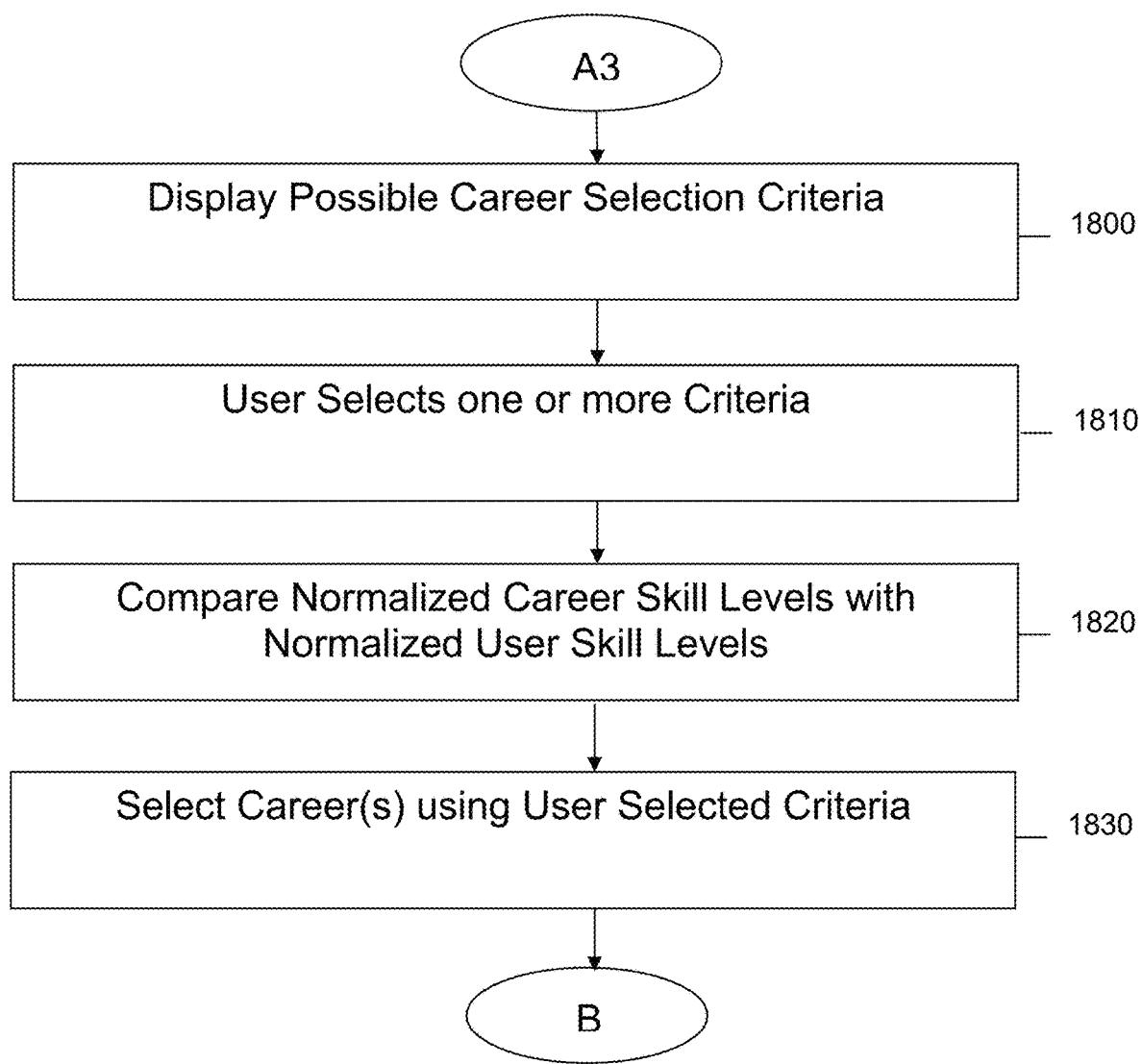
Figure 19:
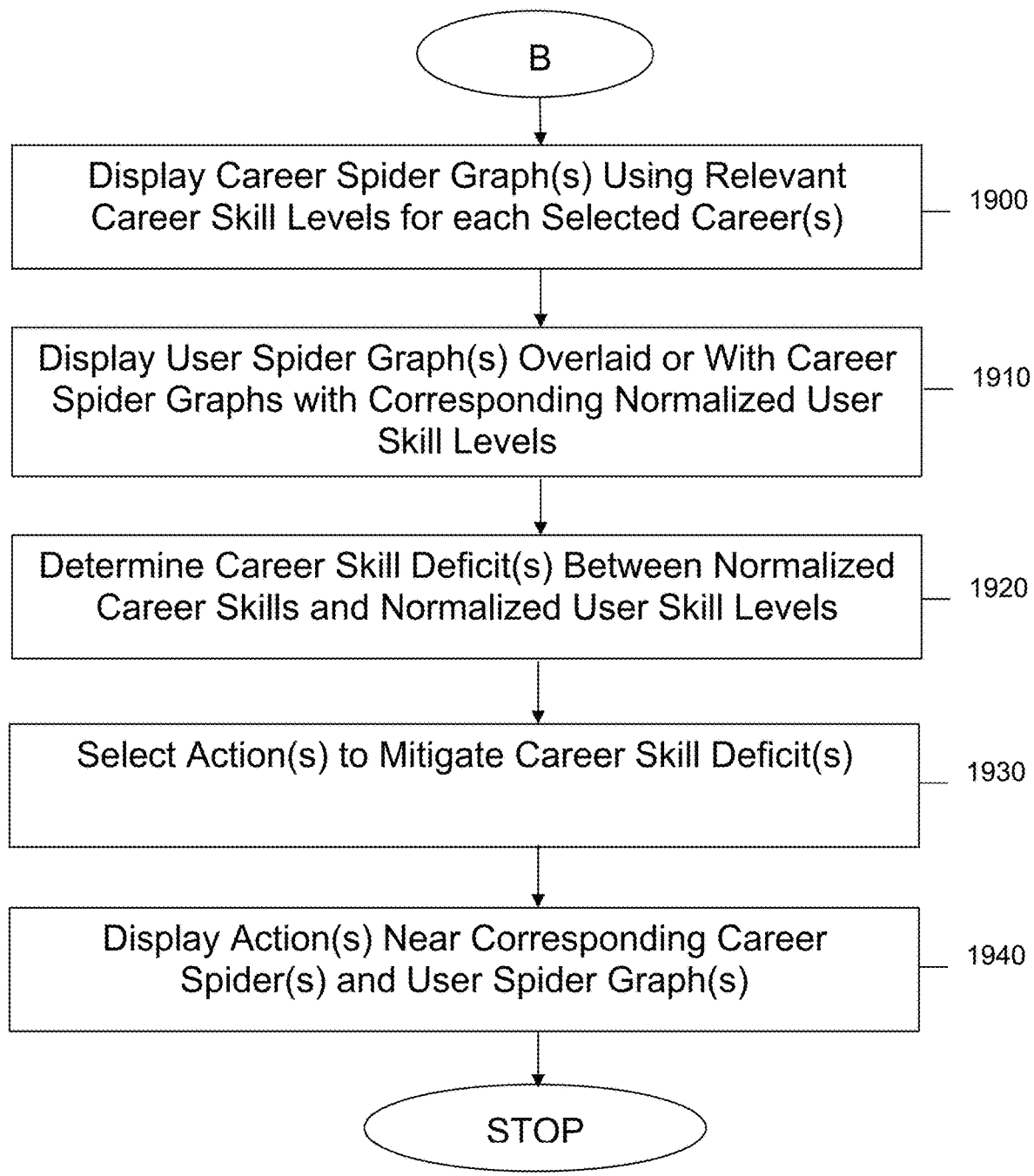

As a non-limiting example, FIG. 14 illustrates an interface 1400 that displays the scores for various skills of the learner 350 with the various skills necessary for a particular career or job title. A plurality of normalized scores for the learner 350 may be compared against scores necessary, suggested or recommended for different employment positions, careers or job titles. Thus, if the learner 350 wants a particular career of marketing director, but has a creative writing score below a listed necessary, suggested or recommended creative writing score for the position of a marketing director, the learner 350 may focus on that particular skill in the future. In other embodiments, the system may also suggest that a learner include a skill (in the feedback request criteria) that the learner is low in or that the system does not have enough data on yet. In addition, the learner 350 may discover other employment positions, careers or job titles that match closely or where the learner 350 exceeds the necessary, suggested or recommended scores and thus may learn of a new career path that may be well suited to the learner 350 that the learner 350 had not considered before and then track skills and pursue feedback on these attributes over time.

The career skills component of the invention may be used to help learners 350 track their progress towards their targeted careers. The career skills component may also match learners 350, based on feedback data, and usage analytics, to careers that the learners 350 may not have considered or targeted previously. The career skills component may reference visualizations of skills needed in a given career and track and promote learner 350 progress towards those skills. Learner 350 skills relative to desired level on the career skills graph will be earned through feedback requests that include rating specific skills the learner needs and responses that address specific skills (for example via NLP). Just as in gaming, a learner 350 may start with zero points on the career skills graph and earn progress on it based on feedback requests and metrics. Skills (perhaps the top 2 or 3) for which more evidence is needed will be suggested as a default when the learner 350 submits a new request; there may be an option to modify the new request before sending the request out. Progress along a certain dimension of the career skills graph may be calculated based on metrics such as ratings and responses specific to a given skill (e.g., critical thinking as a criterion within a rubric) and the credibility and status of those providing the feedback.

FIGS. 15-19 illustrate other methods for providing visual and textual career guidance to a user. Specifically, the methods display, for a selected career, a graph representing normalized career skill levels 2020 superimposed, i.e., displayed at the same time and in the same location, with a graph representing normalized user skill levels 2030 for a plurality of career skills 2010 that are important for the selected career. In addition, the methods allow for graphs to be displayed for a plurality of different selected careers. The methods may also display one or more actions 2080, 2081, 2082 to the user based on any deficiencies 2060 between the normalized user skill levels 2030 and the normalized career skill levels 2020 for one or more careers to assist the user in improving the user's skills so that the user may become qualified for the one or more selected careers.

Figure 20:
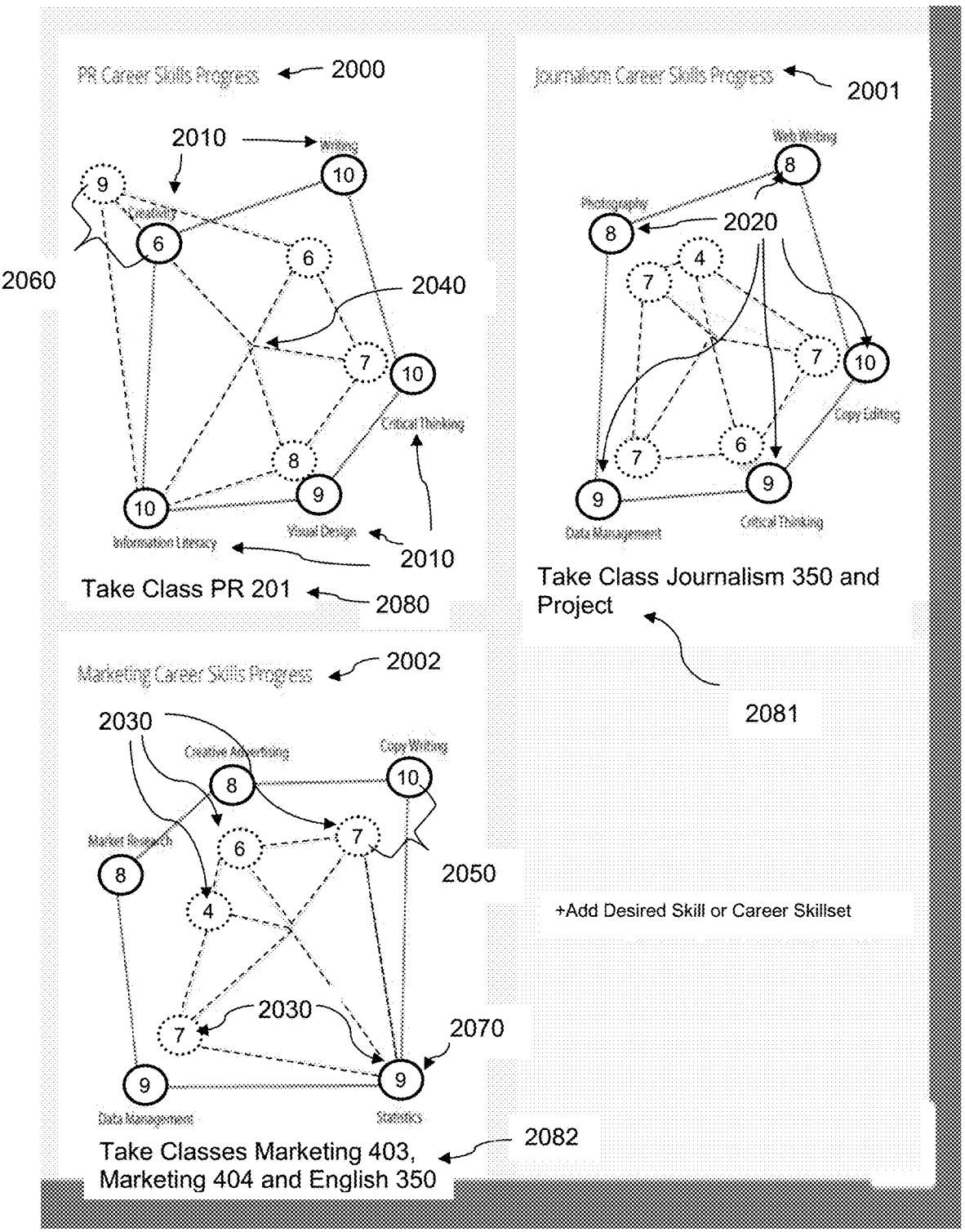
FIG. 20 Illustrates an example of information that may be displayed to the user, comparing normalized user skill levels with normalized career skill levels for three different example careers.

Referring specifically to FIG. 20, three sets of graphs for three different selected careers are illustrated. The three different selected careers illustrated as non-limiting examples in FIG. 20 are PR (Public Relations) 2000, Journalism 2001 and Marketing 2002. While the three different selected careers are general, the selected careers may be more or less specific as desired compared to these non-limiting examples.

Each set of graphs may be, as non-limiting examples, a spidergram, spider diagram or a radar chart. The set of graphs may be a graphical display of multivariate data in the form of a two-dimensional (or using virtual reality technology may create three-dimensional) chart of three or more quantitative variables represented on axes or vertices on a polygon starting from the same point or focus. The position and/or angle of the axes might not convey data, while the data is conveyed by the length of each axes or vertex from the point or focus.

It should be appreciated that any number of sets of graphs for selected careers may be generated and used, but are preferably at least one, and no more than eight, displayed selected careers. Generating and displaying fewer selected careers allows the graphs to be larger in size and thus easier to view, while generating and displaying more selected careers provides information regarding additional selected careers to the user. A database may be used to store a plurality of different careers that may be selected from in order to select the one or more selected careers.

Each selected career has a plurality of different career skills 2010 that have been previously determined to be important or essential in order to be well qualified for that selected career. It should be appreciated that the career skills 2010 that may be essential in one selected career may not be needed at all in a different selected career. Thus, each selected career has a combination of career skills 2010 that are the most important career skills 2010 for that selected career. While each career may have any number of career skills 2010 that are essential for the career, in preferred embodiments, each career is assigned three to eight different career skills 2010 that are the most important career skills 2010 for being effective in that particular career.

As non-limiting examples, FIG. 20 illustrates the career PR 2000 as requiring or recommending the career skills 2010 of Writing, Critical Thinking, Visual Design, Information Literacy and Creativity; the career Journalism 2001 having the career skills 2010 of Web Writing, Copy Editing, Critical Thinking, Data Management and Photography; and the career Marketing 2002 having the career skills 2010 of Copy Writing, Statistics, Data Management, Market Research and Creative Advertising. Thus, according to the example illustrated in FIG. 20, the career of PR 2000 has as its most important skills the career skills 2010 of Writing, Critical Thinking, Visual Design, Information Literacy and Creativity. Also according to FIG. 20, the career of Journalism 2001 has as its most important skills the career skills 2010 of Web Writing, Copy Editing, Critical Thinking, Data Management and Photography. Further, according to FIG. 20, the career of Marketing 2002 has as its most important skills the career skills 2010 of Copy Writing, Statistics, Data Management, Market Research and Creative Advertising.

Each career skill 2010 for a particular career may also be assigned a career skill level. The career skill level 2020 indicates how talented, skilled or capable a user should be at that career skill 2010 to be effective working at or being employed in that career. This reflects the fact that career skills 2010 needed for a particular career may not all be needed at the same level. In other words, some career skills 2010, even compared to other important career skills 2010 for the same career, may be needed at a higher or a lower level than other career skills 2010. In addition, the same career skill 2010, for example writing, may be important for multiple careers (but not all careers), but may be required at different career skill levels 2020 for each of the multiple careers.

As a non-limiting example, FIG. 20 illustrates that the career PR 2000 has a recommended career skill level 2020 of 10 for the career skill 2010 of Writing, the career skill level 2020 of 10 for the career skill 2010 of Critical Thinking, the career skill level 2020 of 9 for the career skill 2010 of Visual Design, the career skill level 2020 of 10 for the career skill 2010 of Information Literacy and the career skill level 2020 of 6 for the career skill 2010 of Creativity.

As another non-limiting example, FIG. 20 also illustrates that the career Journalism 2001 has a recommended career skill level 2020 of 8 for the career skill 2010 of Web Writing, a career skill level 2020 of 10 for the career skill 2010 of Copy Editing, a career skill level 2020 of 9 for the career skill 2010 of Critical Thinking, a career skill level 2020 of 9 for the career skill 2010 of Data Management and a career skill level 2020 of 8 for the career skill 2010 of Photography.

As yet another non-limiting example, FIG. 20 also illustrates that the career Marketing 2002 has a recommended career skill level 2020 of 10 for the career skill 2010 of Copy Writing, a career skill level 2020 of 9 for the career skill 2010 of Statistics, a career skill level 2020 of 9 for the career skill 2010 of Data Management, a career skill level 2020 of 8 for the career skill 2010 of Market Research and a career skill level 2020 of 8 for the career skill 2010 of Creative Advertising.

Each selected career may have a set of graphs, such as one graph for the normalized career skill levels 2020 and one graph for the normalized user skill levels 2030 for the same plurality of career skills 2010. Each graph in the set of graphs for the selected career is preferably constructed so that each graph is a polygon with each vertex of the polygon corresponding to a different one of the plurality of career skills 2010. Each graph in the set of graphs has the same number of vertices so that each vertex represents one career skill 2010. Each graph in the set of graphs for the career also preferably share a common position for a focus 2040.

In a preferred embodiment, the focus 2040 and each vertex for the same career skill 2010 for each graph in the set of graphs are on a single line. This results in one spoke, which may or may not be displayed on the graphs, for each career skill 2010 radiating out from the focus 2040 to the different vertices of the polygons. The spokes/vertices representing the career skills 2010 are preferably displayed radially symmetrical, i.e., equally spaced apart from each other, with the other spokes/vertices by the same angle from the focus 2040.

The distance from a focus 2040 of a graph, representing normalized career skill levels 2020, to a vertex of the graph corresponds to a normalized career skill level. The distance from a focus 2040 of a graph, representing normalized user skill levels, to a vertex of the graph corresponds to a normalized user skill level. In other words, higher normalized career skill levels 2020 and higher normalized user skill levels 2030 are represented on the graphs by longer distances from the focus 2040 to a corresponding vertex, while lower normalized career skill levels 2020 and lower normalized user skill levels 2030 are represented by shorter distances from the focus 2040 to a corresponding vertex. This allows the user to easily compare their skill levels against corresponding career skill levels 2020 necessary for the selected career. This also allows an online guidance system to recommend one or more actions 2080, 2081, 2082 to the user based on any deficiencies 2060 (career skills 2010 where the normalized career skill level 2020 is greater than the normalized user skill level) to any of the displayed career skills 2010.

As an example, a user deficiency 2050 is illustrated for the career skill 2010 Copy Writing for the career Marketing 2002 as the user has a user skill level 2030 of 7 while the recommended career skill level 2020 is 10. This user deficiency 2050 indicates the user may need to take some action 2080, 2081, 2082 (such as taking a class or performing a project) to mitigate/reduce/eliminate the user deficiency 2050. As another example, a user over-qualification 2060 is illustrated for the career skill 2010 Creativity for the career PR 2000 as the user has a user skill level 2030 of 9 while the recommended career skill level 2020 is 6. This user over-qualification 2060 indicates that the user no longer needs to take any action 2080, 2081, 2082 regarding this career skill 2010 and instead should focus on improving other career skills 2010 that have a user deficiency 2050.

The career skill levels 2020 are preferably normalized to a desired scale to produce a plurality of normalized career skill levels 2020 for each career that are displayed. While any scale may be used, in the illustrated examples in FIG. 20, the career skill levels 2020 are normalized to be on a scale of one to 10. On this scale, a one for a career skill level 2020 may be used to indicate that the career skill 2010 is barely needed for the selected career while a career skill level 2020 of 10 may be used to indicate that the career skill 2010 is needed at a very high level for the user to be effective in the selected career.

The career skill levels 2020 are preferably normalized before being stored in a database so that the normalization process only has to be calculated/performed one time. However, in another embodiment, the career skill levels 2020 are stored in the database not normalized and the career skill levels 2020 are normalized every time after being read from the database, but before being used to produce the illustrated graphs.

It should be appreciated that the selected careers, career skills 2010, normalized career skill levels 2020 and normalized user skill levels 2030 displayed in FIG. 20 are only displayed as examples for the purpose of explaining the invention and the invention is not limited to the specific displayed careers, career skills 2010, normalized career skill levels 2020 or normalized user skill levels.

In an embodiment of the invention, an online career guidance system may authenticate and log user in to a user account. (Step 1500) Any type of authentication method may be used, such as knowledge of a user account and corresponding password and/or biometric information of the user.

The online career guidance system may read from a first database a plurality of user scores, wherein each user score is determined from a different achievement of the user. (Step 1510) As a non-limiting example, a user score may be a grade (such as a letter grade or a numerical grade) received from a particular class or any other achievement of the user that may be used to calculate a user skill level 2030 for a particular career skill 2010. The online career guidance system may retrieve data from a table or database to determine that the user score may be used to calculate one or more user skill levels 2030 for one or more corresponding career skills 2010. Thus, a user score, such as a grade in one class, may be used to calculate one or more different career skill levels 2020 for a corresponding one or more different career skills 2010. (Step 1520)

As an example, the user may have received a user score, e.g., a grade, in a writing class. The class is preferably one of many classes that has previously been reviewed to determine that the user scores in the class may be used to determine a user skill level 2030 in one or more career skills 2010. As a non-limiting example, the user score in a writing class may be used to determine a user skill level 2030 in the career skill 2010 of Writing and a user skill level 2030 in the career skill 2010 of Researching.

Letter grades may be normalized by any desired method. As an example, an "A" may be normalized to a "10," a "B" may be normalized to an "8," a "C" may be normalized to a "6," a "D" may be normalized to a "4" and an "F" may be normalized to a "2."

As another set of examples, a user score of "97" in a class may be normalized to a "10," a user score of "91" may be normalized to a "9," a user score of "77" may be normalized to an "8." This normalization method may be performed by dividing the user score by 10 and then rounding the result, i.e., quotient, to the nearest integer to generate a user skill level.

In other embodiments, each user score, user skill level and/or normalized user skill level is weighted based on importance, validity, degree to which it is related to the career skill, source, recency, type of assessment or action and/or a course from which the score was taken in context of a larger program, e.g., data analysis input from College Math 101 is weaker (weighted less) than data analysis input from Math for Data Science 2.

This process may be continued for each user score for the user that is available to the online career guidance system. In the event the user has two or more different normalized user skill levels 2030 for the same career skill 2010, the different normalized user skill levels 2030 may be: 1) averaged; 2) only the normalized user skill level 2030 based on the most recently received user score is used; or 3) only the normalized user skill levels 2030 based on received user score(s) within a most recent time period, such as within the last year, are averaged together. This results in each career skill 2010 for the user having only one normalized user skill level.

In this manner the online career guidance system may generate a plurality of normalized user skill levels 2030 for a corresponding plurality of career skills 2010 for the user. (Step 1530) Each normalized user skill level 2030 represents a predicted level of a skill of the user for a particular career skill 2010 predetermined to be desired in one or more careers.

The online career guidance system may read from a second database (which could be the same database as the first database) a plurality of careers and a plurality of career skill levels 2020 for each of the plurality of careers. (Step 1540) Each career skill level 2020 for each of the plurality of careers represents a level of a skill predetermined to be desired, recommended and/or essential in effectively performing the career. The career skill levels 2020 are preferably normalized to match the scale of the user skill levels 2030 to produce normalized career skill levels 2020. In a preferred embodiment, the user skill levels 2030 and career skill levels 2020 are both normalized to be on the scale of 1 to 10 or 0 to 10. (Step 1550)

The online career guidance system may have previously normalized the career skill levels 2020 prior to storage on the second database so that the career skill levels 2020 are already normalized upon reading them from the second database or the online career guidance system may normalize the plurality of career skill levels 2020 every time after reading them from the second database to produce the plurality of normalized career skill levels 2020.

The online career guidance system may select which career(s) to display on a client to the user using any desired method. As a non-limiting method of selecting a career(s), the online career guidance system may display a plurality of careers to the user on the client device. (Step 1600) The plurality of careers may be in a displayed list or may be displayed in a drop down menu on the client so that the user is able to select one or more of the plurality of careers. The online career guidance system may receive from the user the selection of a career (or a plurality of selected careers) in the plurality of careers displayed to the user. This method allows the user to directly select the career(s) that will be used to compare the normalized user skill levels 2030 against the normalized career skill levels 2020 for the selected career(s). (Step 1610) In another embodiment, a search/discovery option may be displayed for the user to enter a career name like Corporate Trainer. The user may then be displayed one or more careers related to the entered career, possibly such as Museum Education.

As another non-limiting method of selecting a career(s), the online career guidance system may compare the plurality of normalized career skill levels 2020 for each career in the plurality of careers with a corresponding plurality of normalized user skill levels 2030 in the plurality of normalized user skill levels. (Step 1700) The comparison may be performed by subtracting the normalized user skill levels 2030 from the corresponding normalized career skill levels 2020 or subtracting the normalized career skill levels 2020 from the corresponding normalized user skill levels. The online career guidance system may select a career (or a plurality of selected careers) in the plurality of careers with a plurality of normalized career skill levels 2020 that most closely matches (has the smallest absolute difference) a corresponding plurality of normalized user skill levels. This method allows the online career guidance system to select the career(s) that are the most closely aligned to the user's current qualifications, i.e., normalized user skill levels. In another embodiment, the online career guidance system may select the career(s) that produces the greatest difference when subtracting the normalized user skill levels 2030 from the corresponding normalized career skill levels 2020. This method allows the online career guidance system to select the career(s) for which the user is the most qualified (or perhaps even the most overqualified). (Step 1710)

As another non-limiting method of selecting a career(s), the online career guidance system may display on the client a plurality of criteria for selecting a career in the plurality of careers. (Step 1800) As non-limiting examples, the displayed criteria for the user to select may be "only careers fully qualified for," "careers most closely qualified for," "careers with the fewest career skills with deficits," "careers most overqualified for," or "stretch careers."

The user may select one of the criteria to use in selecting a career(s). (Step 1810) The online career guidance system may receive the criteria selected by the user from the plurality of criteria. The online career guidance system may compare a plurality of normalized career skill levels 2020 for each career in the plurality of careers with a corresponding plurality of normalized user skill levels 2030 in the plurality of normalized user skill levels. (Step 1820) The online career guidance system may select a career(s) from the plurality of careers based on the criteria selected by the user and the comparing of the plurality of normalized career skill levels 2020 with the corresponding plurality of normalized user skill levels. (Step 1830)

Thus, if the user selects the criteria of "most overqualified for," the online career guidance system may compare the normalized user skill levels 2030 against various career skill levels 2020 for different careers to determine the career(s) that the user is the most (or possibly the top two, three or four) over qualified for. This may be determined, as an example, by subtracting the user skill levels 2030 from the corresponding career skill levels 2020, adding the differences and then dividing the total by the number of career skills 2010 used for that career (to account for the fact that careers may have different numbers of career skills 2010 that are deemed important or essential for the career). This produces an average deficiency (or over qualification 2050) per career skill 2010 for each career. The career(s) with the lowest deficiency and/or highest over qualification 2050 may be selected for display to the user based on the criteria "most overqualified for" being selected by the user.

The online career guidance system may then display for each selected career a set of graphs, preferably sharing a common focus 2040 or reference point, comprising a graph representing the normalized career skill levels 2020 simultaneously (Step 1900) superimposed on or with a graph representing the normalized user skill levels 2030 (Step 1910). The representation of the two graphs visually displays to the user which of the selected careers the user is well qualified for and which of the selected careers the user would need to improve on one or more career skills 2010.

Each graph in a set of graphs for a selected career may be a polygon with three to eight vertices that shares a common focus 2040 or reference point with the other graphs. As an example, the online career guidance system may display on the client to the user a first polygon having a first plurality of vertices and a first focus 2040. Each vertex of the first polygon is preferably spaced a distance from the first focus 2040 based on a normalized career skill level 2020 in the plurality of normalized career skill levels 2020 for the selected career. The greater the normalized career skill level, the farther the distance the corresponding vertex is from the focus 2040.

The online career guidance system may also simultaneously display on the client to the user a second polygon, superimposed with the first polygon, having a second plurality of vertices and a second focus 2040. The first polygon and the second polygon have the same number of vertices and the second focus 2040 is located at the same position on the client as the first focus 2040.

Each vertex of the second polygon is spaced a distance from the second focus 2040 based on a normalized user skill level 2030 in the plurality of normalized user skill levels 2030 for the selected career. The greater the normalized career skill level, the farther the distance the corresponding vertex is from the focus 2040.

Each vertex of the second polygon may be located on a hypothetical line defined by the first focus 2040 and a corresponding vertex of the first polygon. Thus, some vertices may be closer and some vertices may be farther away from the focus 2040 or reference point, so that the first polygon and/or the second polygon are irregular polygons.

Each vertex of the first polygon or the second polygon may be labeled with a career skill 2010 that corresponds with the normalized career skill level 2020 and the normalized user skill level 2030 for that vertex. As a specific example, the vertices for the polygons for the career PR 2000 in FIG. 20 are labeled "Writing," "Critical Thinking," "Visual Design," "Information Literacy," and "Creativity."

In some embodiments, normalized user skill levels 2030 may be determined at various points in time. This allows a plurality of graphs to be displayed that show the user's progress (hopefully) in various career skills 2010 over time. Thus, the online career guidance system may determine a plurality of normalized prior user skill levels, wherein each normalized prior skill level is a skill level of the user at a same prior date. The online career guidance system may display on the client to the user a third polygon, superimposed with the first polygon and the second polygon, having a third plurality of vertices and a third focus 2040. The first polygon, the second polygon and the third polygon may have the same number of vertices and the third focus 2040 is located in the same position on the client as the first focus 2040 and the second focus 2040. Each vertex of the third polygon is spaced a distance from the third focus 2040 based on a normalized prior user skill level 2030 in the plurality of normalized prior user skill levels 2030 for the selected career. Each vertex of the third polygon may be located on a hypothetical line defined by the first focus 2040 and a corresponding vertex of the first polygon. This method may be used to illustrate the growth of the user's skills in the various career skills 2010 as the third polygon will typically be the smallest, with the second polygon, representing the more recent skill levels, being larger, with the difference thereby representing any improvements of the user over time for the various career skills 2010.

The online career guidance system may determine a career skill deficit between a normalized career skill level 2020 in the plurality of normalized career skill levels 2020 for the selected career and a corresponding normalized user career skill level 2020 in the plurality of normalized user career skill levels 2020. (Step 1920) As an example, a user deficit 2050 is illustrated for the career skill 2010 of Copy Writing for the career Marketing 2002. In this example, the career skill 2010 Copy Writing has a normalized career skill level 2020 of 10 while the user only has a normalized user skill level 2030 of 7. Thus, the user has a deficit of 10 minus 7 or 3 for the career skill 2010 of Copy Writing.

The online career guidance system may have a database that stores one or more actions 2080, 2081, 2082 that are known to reduce, eliminate or mitigate deficits in one or more of the career skills 2010. Thus, the online career guidance system may have one or more classes, clubs, organizations or projects that the online career guidance system may recommend to the user based on the various career skill deficit(s) for each selected career. As another example, the online career guidance system may recommend that the user pursue outside feedback from five or more people on three or more artifacts (work products) that would then provide inputs for the spider graph that are relevant to the skill in question.

The online career guidance system may select one or more actions 2080, 2081, 2082, i.e., classes and/or projects, to reduce any deficiencies 2060. (Step 1930) In a preferred embodiment, the online career guidance system selects the fewest possible class(es) and/or project(s) that, based on past users, will reduce, eliminate or mitigate all of the deficits. As an example, if the user has a deficit in a career skill #1 and a career skill #2 and a particular class is known to improve a corresponding normalized user skill level 2030 for the career skill #1 and the career skill #2, the online career guidance system may recommend the one class in an attempt to remedy both deficiencies 2060.

In some cases, where a user deficiency is substantial, the online career guidance system may, based on previous experience, determine that a single class and/or project will not fully correct the user deficiency and thus may recommend two or more classes/projects to mitigate the one substantial deficiency. The online career guidance system may display the action 2080, 2081, 2082, comprising one or more classes and/or projects, on the client to the user near the first polygon and the second polygon. (Step 1940) As non-limiting examples, the action 2080 of "Take Class PR 201" is illustrated for the career PR, the action 2081 of "Take Class Journalism 350 and Project—Create a Website illustrating Photographs that are Stored in a Database" is illustrated for the career Journalism 2001 and the action 2082 of "Take Classes Marketing 403, Marketing 404 and English 350" is illustrated for the career Marketing 2002.

In some embodiments, the online career guidance system in recommending a mitigation action may base any actions on a profile as the user. As non-limiting examples, the user profile may be used to determine that the user has a preference for certain actions over other actions, such as more willing to request additional feedback verses taking another course or performing an action that is free verses performing an action that requires additional costs for the user.

In some embodiments, the displayed actions 2080, 2081, 2082 may be selectable by the user. In these cases the online career guidance system may receive a selection of the action 2080, 2081, 2082 on the client from the user. The online career guidance system may perform a registration process of the user for the action 2080, 2081, 2082. As an example, if the user selects the displayed recommended action 2080 of "Take Class PR 201," the online career guidance system may start the process and actually register the user in to the class PR 201.

The actions 2080, 2081, 2082 recommended and their effectiveness, after being performed, in changing one or more normalized user skill levels 2030 for various career skills 2010 may be determined and stored in a database. Thus, later users may benefit as the online career guidance system may recommend the actions 2080, 2081, 2082 that have been shown to be the most effective at improving a career skill 2010 to the user that needs to improve on the career skills 2010. This allows the online career guidance system to become better at suggesting actions 2080, 2081, 2082 over time.

In some embodiments, the user may view a 3-dimensional model of the set of graphs for each selected career. Computer software may be used to calculate a mathematical representation of the surface of the set of graphs for each selected career. The 3-dimensional model may be displayed as a 2-dimensional image through a process of 3D rendering or used in a computer simulation to view the 3-dimensional model of the set of graphs as a physical object. The 3-dimensional model of the set of graphs may be viewed using any desired technique of generating virtual reality. As a non-limiting example, the user may use special glasses or goggles to view the 3-dimensional image.

In another non-limiting example, the set of graphs for each selected career may be displayed as a hologram created by the interference of light beams from a laser or other coherent light source. The 3-dimensional model of the set of graphs for each selected career may further assist or enhance the user's experience in determining which career skills 2010 for different careers the user is qualified for and which career skills 2010 needs further development through additional training, which may be suggested to the user.

In another embodiment, an application, related widget or extension may allow a user to view and compare sets of graphs for posted jobs with their own sets of graphs. The user may also search for jobs that most closely match their own sets of graphs.

In another embodiment, there could be a mechanism for users to see the skills graphs of their friends or contacts on Linkedin™ or the aggregate of skills of people in certain types of roles, e.g., a set of graphs representing the average for all of the robotics engineers at Google™.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system for providing career guidance to a user, comprising:
   a database coupled to a communication network and storing a plurality of user accounts, a plurality of user scores, a plurality of skills, and a plurality of skill levels;
   a server comprising a computing device coupled to the communication network and comprising at least one processor executing instructions within a memory which, when executed, cause the system to:
      receive, via user input into a first graphical user interface (GUI) displayed on a client device, an authentication data;
      authenticate a user by executing a first database command selecting a user account, matching the authentication data, from the plurality of user accounts;
      execute a second database command selecting the plurality of user scores, wherein each user score in the plurality of user scores is determined from a different achievement of the user;
      execute a first software data logic converting each user score in the plurality of user scores into one or more user skill levels thereby generating a plurality of user skill levels, wherein each user skill level represents a predicted level of a skill of the user for a particular skill predetermined to be desired in one or more careers;
      execute a second software data logic normalizing the plurality of user skill levels to a desired scale to generate a plurality of normalized user skill levels;
      execute a third database command selecting the plurality of careers and the plurality of career skill levels for each of the plurality of careers, wherein each career skill level for each of the plurality of careers represents a level of a skill predetermined to be desired in the career;
      execute a third software data logic normalizing the plurality of career skill levels to generate a plurality of normalized career skill levels;
      generate a second GUI displaying the plurality of careers;
      transmit the second GUI to the user for display on the client device;
      receive, from the user via the second GUI on the client device, a selection of a career in the plurality of careers displayed to the user;
      display, on the second GUI on the client device, to the user, a first polygon having a first plurality of vertices and a first focus, wherein each vertex of the first polygon is spaced a distance from the first focus based on a normalized career skill level in the plurality of normalized career skill levels for the selected career;
      display, on the second GUI on the client device, to the user, a second polygon, superimposed with the first polygon, having a second plurality of vertices and a second focus, wherein the first polygon and the second polygon have the same number of vertices and the second focus is located at the same position on the client as the first focus, wherein each vertex of the second polygon is spaced a distance from the second focus based on a normalized user skill level in the plurality of normalized user skill levels for the selected career, wherein each vertex of the second polygon is located on a hypothetical line defined by the first focus and a corresponding vertex of the first polygon and wherein each vertex of the first polygon or the second polygon is labeled with a career skill that corresponds with the normalized career skill level and the normalized user skill level for that vertex;
      determine a career skill deficit between a normalized career skill level in the plurality of normalized career skill levels for the selected career and a corresponding normalized user career skill level in the plurality of normalized user career skill levels;
      select an action that has previously been determined to reduce the career skill deficit;
      determine and display an action on the second GUI on the client device to the user near the first polygon and the second polygon; and
      continuously update the second GUI to display at least one event update from a continuous data stream, including at least one event stream of at least one real-time event.

2. The system of claim 1, wherein the system is further configured to:
   receive a selection of the action on the client by the user; and
   perform a registration process of the user for the action.

3. The system of claim 2, wherein the action is an online educational class.

4. The system of claim 1, wherein the first polygon and the second polygon are irregular polygons.

5. The system of claim 1, wherein each career in the plurality of careers is associated with three to eight different skills predetermined to be desired in the career.

6. The system of claim 1, wherein the system is further configured to:
   determine a plurality of normalized prior user skill levels, wherein each normalized prior skill level is a skill level of the user at a same prior date; and
   generate and display on the client device to the user a third polygon, superimposed with the first polygon and the second polygon, having a third plurality of vertices and a third focus, wherein the first polygon, the second polygon and the third polygon have the same number of vertices and the third focus is located in the same position on the client device as the first focus and the second focus, wherein each vertex of the third polygon is spaced a distance from the third focus based on a normalized prior user skill level in the plurality of normalized prior user skill levels for the selected career, wherein each vertex of the third polygon is located on a hypothetical line defined by the first focus and a corresponding vertex of the first polygon.

7. The system of claim 1, wherein the system is further configured to:
   generate and display a first plurality of polygons comprising vertices that represent a normalized career skill level, wherein each of the first plurality of polygons represents a different career and is superimposed with one of a corresponding second plurality of polygons comprising vertices that represent a normalized user skill level, wherein each polygon, as compared to the other polygons, in the first plurality of polygons comprises a plurality of vertices representing a different combination of career skills predetermined to be desired in the career.

8. A method of providing career guidance to a user, comprising the steps of:
- receiving, via user input into a first graphical user interface (GUI) displayed on a client, an authentication data;
- authenticating a user by executing a first database command selecting a user account, matching the authentication data, from a plurality of user accounts stored in a database;
- executing a second database command selecting, from the database, a plurality of user scores, wherein each user score in the plurality of user scores is determined from a different achievement of the user;
- executing a first software data logic converting each user score in the plurality of user scores into one or more user skill levels thereby generating a plurality of user skill levels, wherein each user skill level represents a predicted level of a skill of the user for a particular skill predetermined to be desired in one or more careers;
- executing a second software data logic normalizing by the online career guidance system the plurality of user skill levels to a desired scale to generate a plurality of normalized user skill levels;
- execute a third database command selecting a plurality of careers and a plurality of career skill levels for each of the plurality of careers from the database, wherein each career skill level for each of the plurality of careers represents a level of a skill predetermined to be desired in the career;
- execute a third software data logic normalizing the plurality of career skill levels to generate a plurality of normalized career skill levels;
- comparing a plurality of normalized career skill levels for each career in the plurality of careers with a corresponding plurality of normalized user skill levels in the plurality of normalized user skill levels;
- selecting, from the database, a career in the plurality of careers with a plurality of normalized career skill levels that most closely matches a corresponding plurality of normalized user skill levels;
- generate a second GUI displaying on the second GUI on the client to the user a first polygon having a first plurality of vertices and a first focus, wherein each vertex of the first polygon is spaced a distance from the first focus based on a normalized career skill level in the plurality of normalized career skill levels for the selected career;
- displaying on the second GUI on the client to the user a second polygon, superimposed with the first polygon, having a second plurality of vertices and a second focus, wherein the first polygon and the second polygon have the same number of vertices and the second focus is located at the same position on the client as the first focus, wherein each vertex of the second polygon is spaced a distance from the second focus based on a normalized user skill level in the plurality of normalized user skill levels for the selected career, wherein each vertex of the second polygon is located on a hypothetical line defined by the first focus and a corresponding vertex of the first polygon and wherein each vertex of the first polygon or the second polygon is labeled with a career skill that corresponds with the normalized career skill level and the normalized user skill level for that vertex;
- determining a career skill deficit between a normalized career skill level in the plurality of normalized career skill levels for the selected career and a corresponding normalized user career skill level in the plurality of normalized user career skill levels;
- selecting an action that has previously been determined to reduce the career skill deficit;
- displaying on the second GUI an action on the client to the user near the first polygon and the second polygon; and
- continuously updating the second GUI to display at least one event update from a continuous data stream, including at least one event stream of at least one real-time event.

9. The method of claim 8, further comprising the steps of:
- receiving a selection of the action on the client by the user; and
- performing a registration process of the user for the action.

10. The method of claim 8, wherein the action is an online educational class.

11. The method of claim 8, wherein the first polygon and the second polygon are irregular polygons.

12. The method of claim 8, wherein each career in the plurality of careers is associated with three to eight different skills predetermined to be desired in the career.

13. The method of claim 8, further comprising the steps of:
- determining a plurality of normalized prior user skill levels, wherein each normalized prior skill level is a skill level of the user at a same prior date; and
- displaying on the client to the user a third polygon, superimposed with the first polygon and the second polygon, having a third plurality of vertices and a third focus, wherein the first polygon, the second polygon and the third polygon have the same number of vertices and the third focus is located in the same position on the client as the first focus and the second focus, wherein each vertex of the third polygon is spaced a distance from the third focus based on a normalized prior user skill level in the plurality of normalized prior user skill levels for the selected career, wherein each vertex of the third polygon is located on a hypothetical line defined by the first focus and a corresponding vertex of the first polygon.

14. The method of claim 8, further comprising the step of:
- displaying a first plurality of polygons comprising vertices that represent a normalized career skill level, wherein each of the first plurality of polygons represents a different career and is superimposed with one of a corresponding second plurality of polygons comprising vertices that represent a normalized user skill level, wherein each polygon, as compared to the other polygons, in the first plurality of polygons comprises a plurality of vertices representing a different combination of career skills predetermined to be desired in the career.

15. A method of providing career guidance to a user, comprising the steps of:
- receiving, via user input into a first graphical user interface (GUI) displayed on a client device, an authentication data;
- authenticating a user by executing a first database command selecting a user account, matching the authentication data, from the plurality of user accounts;
- executing a second database command selecting, from the database a plurality of user scores, wherein each user score in the plurality of user scores is determined from a different achievement of the user;
- executing a first software data logic converting each user score in the plurality of user scores into one or more user skill levels thereby generating a plurality of user skill levels, wherein each user skill level represents a predicted level of a skill of the user for a particular skill predetermined to be desired in one or more careers;

normalizing the plurality of user skill levels to a desired scale to generate a plurality of normalized user skill levels;

reading from a second database a plurality of careers and a plurality of career skill levels for each of the plurality of careers, wherein each career skill level for each of the plurality of careers represents a level of a skill predetermined to be desired in the career;

executing a second software data logic normalizing the plurality of career skill levels to generate a plurality of normalized career skill levels;

generate a second GUI displaying on the second GUI on the client a plurality of criteria for selecting a career in the plurality of careers;

receiving a criteria selected by the user from the plurality of criteria;

comparing a plurality of normalized career skill levels for each career in the plurality of careers with a corresponding plurality of normalized user skill levels in the plurality of normalized user skill levels;

selecting, from the database, a career from the plurality of careers based on the criteria selected by the user and the comparing of the plurality of normalized career skill levels with the corresponding plurality of normalized user skill levels;

displaying on the second GUI on the client to the user a first polygon having a first plurality of vertices and a first focus, wherein each vertex of the first polygon is spaced a distance from the first focus based on a normalized career skill level in the plurality of normalized career skill levels for the selected career;

displaying on the second GUI on the client to the user a second polygon, superimposed with the first polygon, having a second plurality of vertices and a second focus, wherein the first polygon and the second polygon have the same number of vertices and the second focus is located at the same position on the client as the first focus, wherein each vertex of the second polygon is spaced a distance from the second focus based on a normalized user skill level in the plurality of normalized user skill levels for the selected career, wherein each vertex of the second polygon is located on a hypothetical line defined by the first focus and a corresponding vertex of the first polygon and wherein each vertex of the first polygon or the second polygon is labeled with a career skill that corresponds with the normalized career skill level and the normalized user skill level for that vertex;

determining a career skill deficit between a normalized career skill level in the plurality of normalized career skill levels for the selected career and a corresponding normalized user career skill level in the plurality of normalized user career skill levels;

selecting an action that has previously been determined to reduce the career skill deficit;

displaying on the second GUI an action on the client to the user near the first polygon and the second polygon; and continuously updating the second GUI to display at least one event update from a continuous data stream, including at least one event stream of at least one real-time event.

16. The method of claim 15, further comprising the steps of:

receiving a selection of the action on the client by the user; and performing a registration process of the user for the action.

17. The method of claim 15, wherein the action is an online educational class.

18. The method of claim 15, wherein the first polygon and the second polygon are irregular polygons.

19. The method of claim 15, wherein each career in the plurality of careers is associated with three to eight different skills predetermined to be desired in the career.

* * * * *